US008982050B2

(12) United States Patent
Solomon et al.

(10) Patent No.: US 8,982,050 B2
(45) Date of Patent: Mar. 17, 2015

(54) MOTION COMPENSATION IN AN INTERACTIVE DISPLAY SYSTEM

(71) Applicant: Interphase Corporation, Plano, TX (US)

(72) Inventors: Yoram Solomon, Plano, TX (US); Branislav Kisacanin, Plano, TX (US)

(73) Assignee: Interphase Corporation, Carrollton, TX (US)

( * ) Notice: Subject to any disclaimer, the term of this patent is extended or adjusted under 35 U.S.C. 154(b) by 47 days.

(21) Appl. No.: 14/056,286

(22) Filed: Oct. 17, 2013

(65) Prior Publication Data

US 2014/0111433 A1 Apr. 24, 2014

Related U.S. Application Data

(60) Provisional application No. 61/716,308, filed on Oct. 19, 2012, provisional application No. 61/718,985, filed on Oct. 26, 2012.

(51) Int. Cl.
*G06F 3/033* (2013.01)
*G09G 5/08* (2006.01)
(Continued)

(52) U.S. Cl.
CPC ............ *G06F 3/0346* (2013.01); *G06F 3/0304* (2013.01); *G06F 3/0317* (2013.01)
USPC ........... 345/158; 345/156; 345/173; 345/180; 348/63

(58) Field of Classification Search
CPC ..... G06F 3/03393; G06F 3/042; G06F 3/038; G06F 1/1626; G06F 3/0304
USPC ..................... 345/156–158, 173–183; 348/63
See application file for complete search history.

(56) References Cited

U.S. PATENT DOCUMENTS

| | | | | |
|---|---|---|---|---|
| 5,982,352 | A | 11/1999 | Pryor | |
| 6,133,906 | A * | 10/2000 | Geaghan | 345/179 |
| 6,995,748 | B2 | 2/2006 | Gordon et al. | |

(Continued)

FOREIGN PATENT DOCUMENTS

| | | |
|---|---|---|
| WO | 2013054155 A1 | 4/2013 |

OTHER PUBLICATIONS

International Search Report and Written Opinion of the ISA, PCT International Application PCT/US2013/065407 (Jan. 28, 2014).

(Continued)

*Primary Examiner* — Kimnhung Nguyen
(74) *Attorney, Agent, or Firm* — Anderson & Levine, L.L.P.

(57) ABSTRACT

An interactive display system including a wireless pointing device, and positioning circuitry capable of determining absolute and relative positions of the display at which the pointing device is aimed. The pointing device captures images displayed by the computer, including one or more human-imperceptible positioning targets. The positioning targets are presented as patterned modulation of the intensity (e.g., variation in pixel intensity) in a display frame of the visual payload, followed by the opposite modulation in a successive frame. At least two captured image frames are subtracted from one another to recover the positioning target in the captured visual data and to remove the displayed image payload. Motion of the pointing device between the two frames is detected by relative motion sensors, and used to align the positions of the positioning targets in the captured images for those frames to improve the fidelity of the recovered positioning target following the subtraction.

20 Claims, 11 Drawing Sheets

(51) Int. Cl.

| | |
|---|---|
| ***G06F 3/0346*** | (2013.01) |
| ***G06F 3/03*** | (2006.01) |

(56) References Cited

U.S. PATENT DOCUMENTS

| | | | | |
|---|---|---|---|---|
| 7,158,118 | B2 | 1/2007 | Liberty | |
| 7,187,412 | B1 | 3/2007 | Silverstein | |
| 7,233,316 | B2 | 6/2007 | Smith et al. | |
| 8,184,166 | B2 | 5/2012 | Wang et al. | |
| 8,217,997 | B2 | 7/2012 | Solomon et al. | |
| 8,446,364 | B2 | 5/2013 | Solomon | |
| 8,451,223 | B2 | 5/2013 | Choi et al. | |
| 8,456,534 | B2 | 6/2013 | Henty | |
| 8,471,812 | B2 | 6/2013 | Bunch | |
| 8,681,208 | B2 * | 3/2014 | Yoshino | 348/65 |
| 8,896,741 | B2 * | 11/2014 | Akagi et al. | 348/333.12 |
| 2002/0075250 | A1 * | 6/2002 | Shigeta et al. | 345/204 |
| 2005/0260986 | A1 | 11/2005 | Sun et al. | |
| 2007/0236451 | A1 | 10/2007 | Ofek et al. | |
| 2008/0106517 | A1 | 5/2008 | Kerr et al. | |
| 2008/0275667 | A1 | 11/2008 | Ohta | |
| 2009/0002344 | A1 | 1/2009 | Wilson et al. | |
| 2010/0085325 | A1 * | 4/2010 | King-Smith et al. | 345/174 |
| 2010/0228632 | A1 * | 9/2010 | Rodriguez | 705/14.66 |
| 2011/0227827 | A1 * | 9/2011 | Solomon et al. | 345/158 |
| 2011/0298710 | A1 | 12/2011 | Ruckhaeberle et al. | |
| 2012/0038549 | A1 | 2/2012 | Mandella et al. | |
| 2012/0086725 | A1 | 4/2012 | Joseph et al. | |
| 2013/0055143 | A1 * | 2/2013 | Martin et al. | 715/779 |
| 2013/0063537 | A1 * | 3/2013 | Emori | 348/14.01 |
| 2014/0118496 | A1 * | 5/2014 | Calakli et al. | 348/46 |

OTHER PUBLICATIONS

U.S. Appl. No. 14/018,695, filed Sep. 5, 2013.

* cited by examiner

MOTION COMPENSATION IN AN INTERACTIVE DISPLAY SYSTEM

CROSS-REFERENCE TO RELATED APPLICATIONS

This application claims priority, under 35 U.S.C. §119(e), of Provisional Application No. 61/716,308, filed Oct. 19, 2012; and Provisional Application No. 61/718,985, filed Oct. 26, 2012; both incorporated herein by this reference.

STATEMENT REGARDING FEDERALLY SPONSORED RESEARCH OR DEVELOPMENT

Not applicable.

BACKGROUND OF THE INVENTION

This invention is in the field of interactive display systems. Embodiments of this invention are more specifically directed to the positioning of the location at a display to which a control device is pointing during the interactive operation of a computer system.

The ability of a speaker to communicate a message to an audience is generally enhanced by the use of visual information, in combination with the spoken word. In the modern era, the use of computers and associated display systems to generate and display visual information to audiences has become commonplace, for example by way of applications such as the POWERPOINT presentation software program available from Microsoft Corporation. For large audiences, such as in an auditorium environment, the display system is generally a projection system (either front or rear projection). For smaller audiences such as in a conference room or classroom environment, flat-panel (e.g., liquid crystal) displays have become popular, especially as the cost of these displays has fallen over recent years. New display technologies, such as small projectors ("pico-projectors"), which do not require a special screen and thus are even more readily deployed, are now reaching the market. For presentations to very small audiences (e.g., one or two people), the graphics display of a laptop computer may suffice to present the visual information. In any case, the combination of increasing computer power and better and larger displays, all at less cost, has increased the use of computer-based presentation systems, in a wide array of contexts (e.g., business, educational, legal, entertainment).

A typical computer-based presentation involves the speaker standing remotely from the display system, so as not to block the audience's view of the visual information. Because the visual presentation is computer-generated and computer-controlled, the presentation is capable of being interactively controlled, to allow selection of visual content of particular importance to a specific audience, annotation or illustration of the visual information by the speaker during the presentation, and invocation of effects such as zooming, selecting links to information elsewhere in the presentation (or online), moving display elements from one display location to another, and the like. This interactivity greatly enhances the presentation, making it more interesting and engaging to the audience.

The ability of a speaker to interact, from a distance, with displayed visual content, is therefore desirable. More specifically, a hand-held device that a remotely-positioned operator could use to point to, and interact with, the displayed visual information is therefore desirable.

U.S. Pat. No. 8,217,997, issued Jul. 10, 2012, entitled "Interactive Display System", commonly assigned herewith and incorporated herein by reference, describes an interactive display system including a wireless human interface device ("HID") constructed as a handheld pointing device including a camera or other video capture system. The pointing device captures images displayed by the computer, including one or more human-imperceptible positioning targets inserted by the computer into the displayed image data. The location, size, and orientation of the recovered positioning target identify the aiming point of the remote pointing device relative to the display.

The positioning of the aiming point of the pointing device according to the approach described in the above-referenced U.S. Pat. No. 8,217,997 is performed at a rate corresponding to the frame rate of the display system. More specifically, a new position can be determined as each new frame of data is displayed, by the combination of the new frame (and its positioning target) and the immediately previous frame (and its complementary positioning target). This approach works quite well in many situations, particularly in the context of navigating and controlling a graphical user interface in a computer system, such as pointing to and "clicking" icons, click-and-drag operations involving displayed windows and frames, and the like. A particular benefit of this approach described in U.S. Pat. No. 8,217,997, is that the positioning is "absolute", in the sense that the result of the determination is a specific position on the display (e.g., pixel coordinates). The accuracy of the positioning carried out according to this approach is quite accurate over a wide range of distances between the display and the handheld device, for example ranging from in physical contact with the display screen to tens of feet away.

Conventional human interface devices based on motion sensors are also known in the art. Motion sensors sense motion of the device over a sequence of sample times. Examples of motion sensors include inertial sensors such as accelerometers, gyroscopes, magnetic field sensors such as magnetometers, and visual systems such as those used in optical mice. The positioning result based on motion sensors is relative, in the sense that an absolute position of the display is not directly determined, but rather the motion sensors determine the position and attitude of the device, and from that the pointed-to location, relative to that at a previous point in time. However, the sample rate at which motion sensor-based pointing devices operate is not limited by the frame rate of the display, and can be much higher, assuming proper registration of the relative positioning. In addition, fewer computations are required to derive the relative positioning result, as compared with those required for absolute positioning. Unfortunately, however, because the positioning provided by these devices is relative, drift or other error can accumulate over time. Error is exacerbated for those devices relying on accelerometer motion sensing, as two integrations are required in order to convert sensed accelerations into linear distances. As such, the accuracy of relative positioning based on motion sensors is generally inferior to that of absolute positioning approaches.

Copending U.S. patent application Ser. No. 14/018,695, filed Sep. 5, 2013, commonly assigned herewith and incorporated herein by this reference, describes an interactive display system including a wireless pointing device and positioning circuitry capable of determining both absolute and relative positions of the display at which the pointing device is aimed. A comparison between the absolute and relative positions at a given time is used to compensate the relative position determined by the motion sensors, enabling both rapid and frequent positioning provided by the motion sensors and also the excellent accuracy provided by absolute positioning.

BRIEF SUMMARY OF THE INVENTION

Embodiments of this invention provide a system and method for rapidly and accurately determining an absolute position of the location at a display at which a handheld human interface device is pointing during the operation of an interactive display system.

Embodiments of this invention provide such a system and method in which such absolute positioning can be performed in systems using visual information acquired at the frame rate of the display system, even in situations in which the user is moving the pointing device rapidly.

Other objects and advantages of embodiments of this invention will be apparent to those of ordinary skill in the art having reference to the following specification together with its drawings.

Embodiments of this invention may be implemented into an interactive display system and method of operating the same in which a remote human interface device includes an image capture subsystem for identifying an absolute location at the display at which the device is pointing, and also one or more motion sensors for detecting relative motion of the pointing device. Absolute positioning is based on the sensing of complementary positioning targets displayed in first and second frames; subtraction of the frame data from the first and second frames recovers the positioning target pattern while canceling out the human-visible content. Inter-frame relative motion of the pointing device, as sensed by the motion sensors, compensates the position of the positioning target in the later one of the frames to align the positioning targets in the first and second frames, facilitating the absolute positioning determination.

DETAILED DESCRIPTION OF THE INVENTION

This invention will be described in connection with one or more of its embodiments, namely as implemented into a computerized presentation system including a display visible by an audience, as it is contemplated that this invention will be particularly beneficial when applied to such a system. However, it is also contemplated that this invention can be useful in connection with other applications, such as gaming systems, general input by a user into a computer system, and the like. Accordingly, it is to be understood that the following description is provided by way of example only, and is not intended to limit the true scope of this invention as claimed.

Figure 1A:
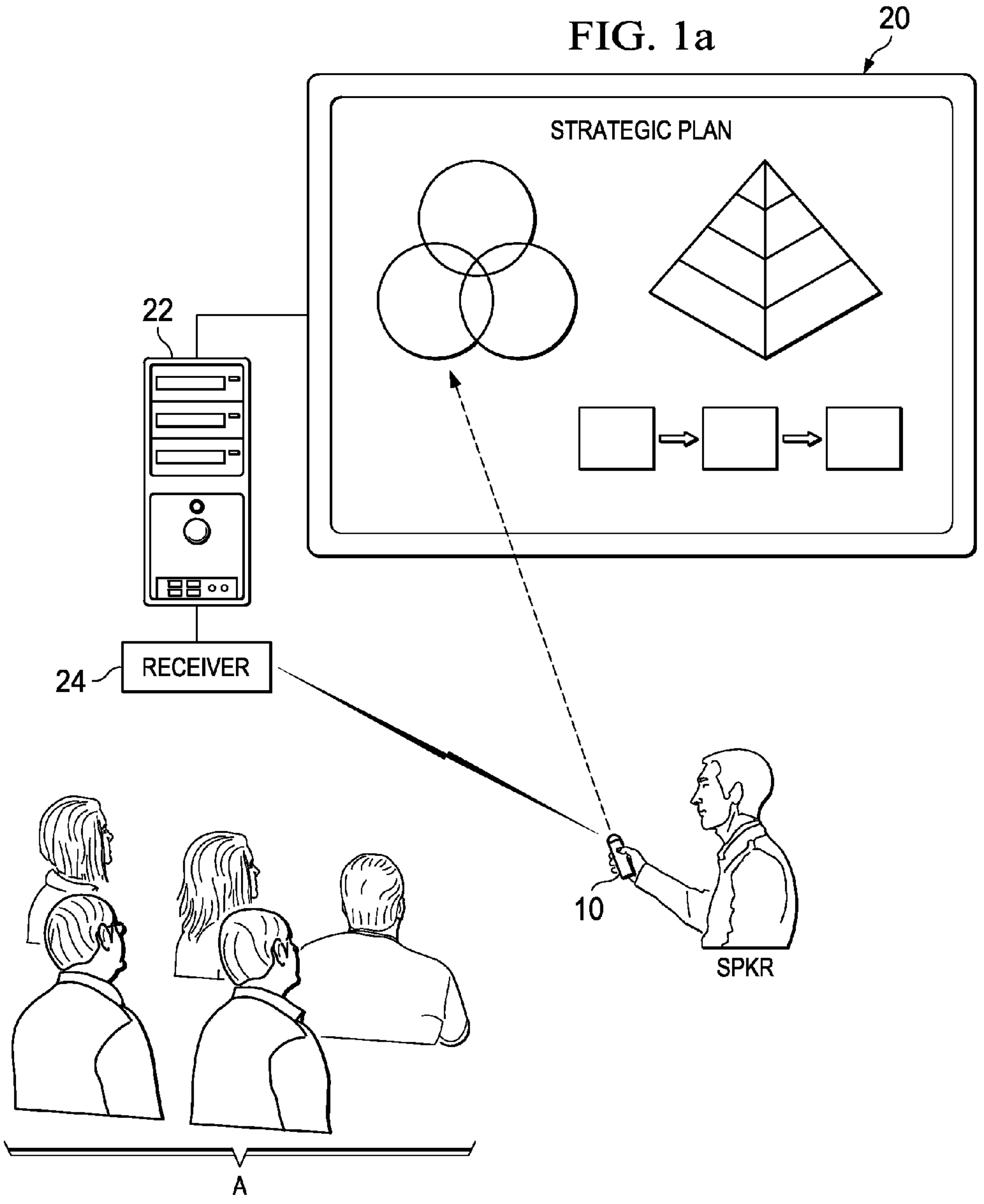
FIGS. 1*a* and 1*b* are schematic perspective views of a speaker presentation being carried out using an interactive display system according to embodiments of the invention.

FIG. 1*a* illustrates a simplified example of an environment in which embodiments of this invention are useful. As shown in FIG. 1*a*, speaker SPKR is giving a live presentation to audience A, with the use of visual aids. In this case, the visual aids are in the form of computer graphics and text, generated by computer 22 and displayed on room-size graphics display 20, in a manner visible to audience A. As known in the art, such presentations are common in the business, educational, entertainment, and other contexts, with the particular audience size and system elements varying widely. The simplified example of FIG. 1*a* illustrates a business environment in which audience A includes several or more members viewing the presentation; of course, the size of the environment may vary from an auditorium, seating hundreds of audience members, to a single desk or table in which audience A consists of a single person.

The types of display 20 used for presenting the visual aids to audience A can also vary, often depending on the size of the presentation environment. In rooms ranging from conference rooms to large-scale auditoriums, display 20 may be a projection display, including a projector disposed either in front of or behind a display screen. In that environment, computer 22 would generate the visual aid image data and forward it to the projector. In smaller environments, display 20 may be an external flat-panel display, such as of the plasma or liquid crystal (LCD) type, directly driven by a graphics adapter in computer 22. For presentations to one or two audience members, computer 22 in the form of a laptop or desktop computer may simply use its own display 20 to present the visual information. Also for smaller audiences A, hand-held projectors (e.g., "pocket projectors" or "pico projectors") are becoming more common, in which case the display screen may be a wall or white board.

The use of computer presentation software to generate and present graphics and text in the context of a presentation is now commonplace. A well-known example of such presentation software is the POWERPOINT software program available from Microsoft Corporation. In the environment of FIG. 1*a*, such presentation software will be executed by computer 22, with each slide in the presentation displayed on display 20 as shown in this example. Of course, the particular visual information need not be a previously created presentation executing at computer 22, but instead may be a web page accessed via computer 22; a desktop display including icons, program windows, and action buttons; video or movie content from a DVD or other storage device being read by computer 22. Other types of visual information useful in connection with embodiments of this invention will be apparent to those skilled in the art having reference to this specification.

In FIG. 1*a*, speaker SPKR is standing away from display 20, so as not to block the view of audience A and also to better engage audience A. According to embodiments of this invention, speaker SPKR uses a handheld human interface device (HID), in the form of pointing device 10, to remotely interact with the visual content displayed by computer 22 at display 20. This interactive use of visual information displayed by display 20 provides speaker SPKR with the ability to extemporize the presentation as deemed useful with a particular audience A, to interface with active content (e.g., Internet links, active icons, virtual buttons, streaming video, and the like), and to actuate advanced graphics and control of the presentation, without requiring speaker SPKR to be seated at or otherwise "pinned" to computer 22.

Figure 1B:
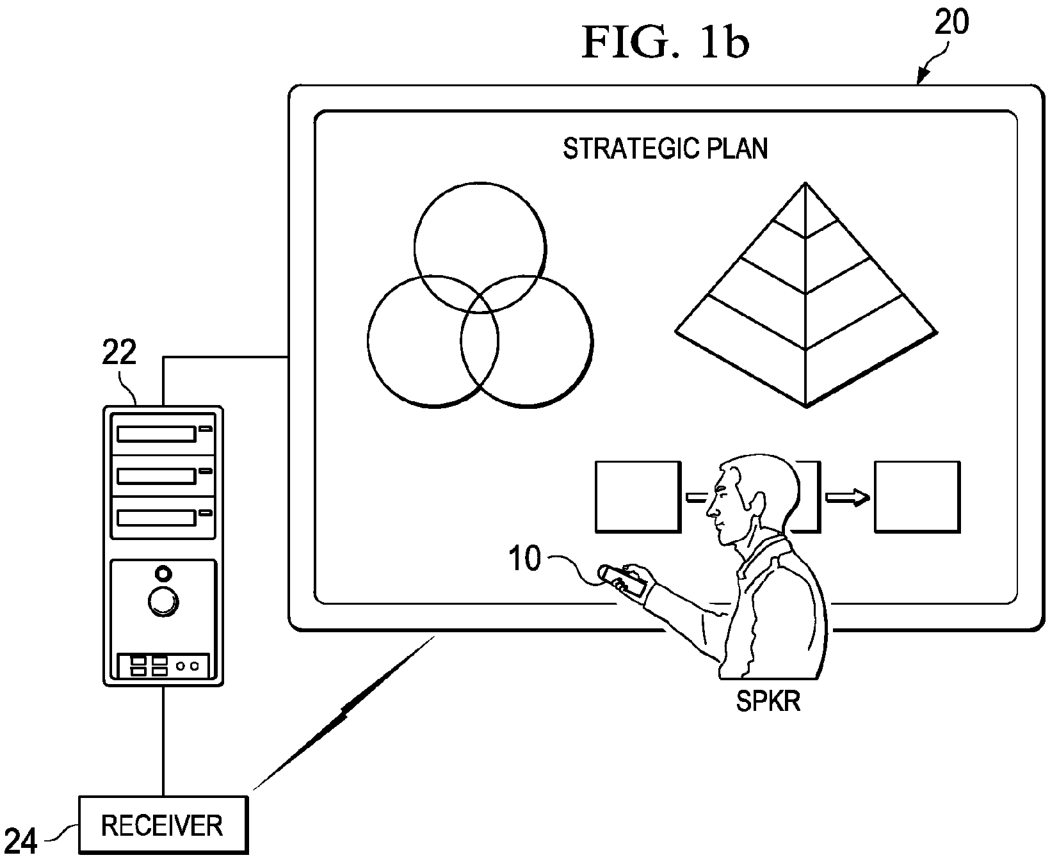

FIG. 1*b* illustrates another use of the system and method of embodiments of this invention, in which speaker SPKR closely approaches display 20 to interact with the visual content. In this example, display 20 is operating as a "white board" on which speaker SPKR may "draw" or "write" using pointing device 10 to actively draw content as annotations to the displayed content, or even on a blank screen as suggested by FIG. 1*b*. Typically, this "drawing" and "writing" would be carried out while placing pointing device 10 in actual physical contact with, or at least in close proximity to, display 20. The hardware, including display 20, in the application of FIG. 1*b* may be identical to that in the presentation example of FIG. 1*a*; indeed, embodiments of this invention allow the same speaker SPKR may interact with the same presentation in front of the same audience both from a distance as shown in FIG. 1*a*, and at display 20 as shown in FIG. 1*b*.

In either case, as described in further detail in the above-incorporated U.S. Pat. No. 8,217,997 and below in this description in connection with particular embodiments of the invention, speaker SPKR carries out this interaction by way of pointing device 10, which is capable of capturing all or part of the image at display 20 and of interacting with a pointed-to (or aimed-at) target location at that image. Pointing device 10 in the examples of FIGS. 1*a* and 1*b* wirelessly communicates this pointed-to location at display 20 and other user commands from speaker SPKR, to receiver 24 and thus to computer 22. In this manner, according to embodiments of this invention, remote interactivity with computer 22 is carried out.

Figure 2A:
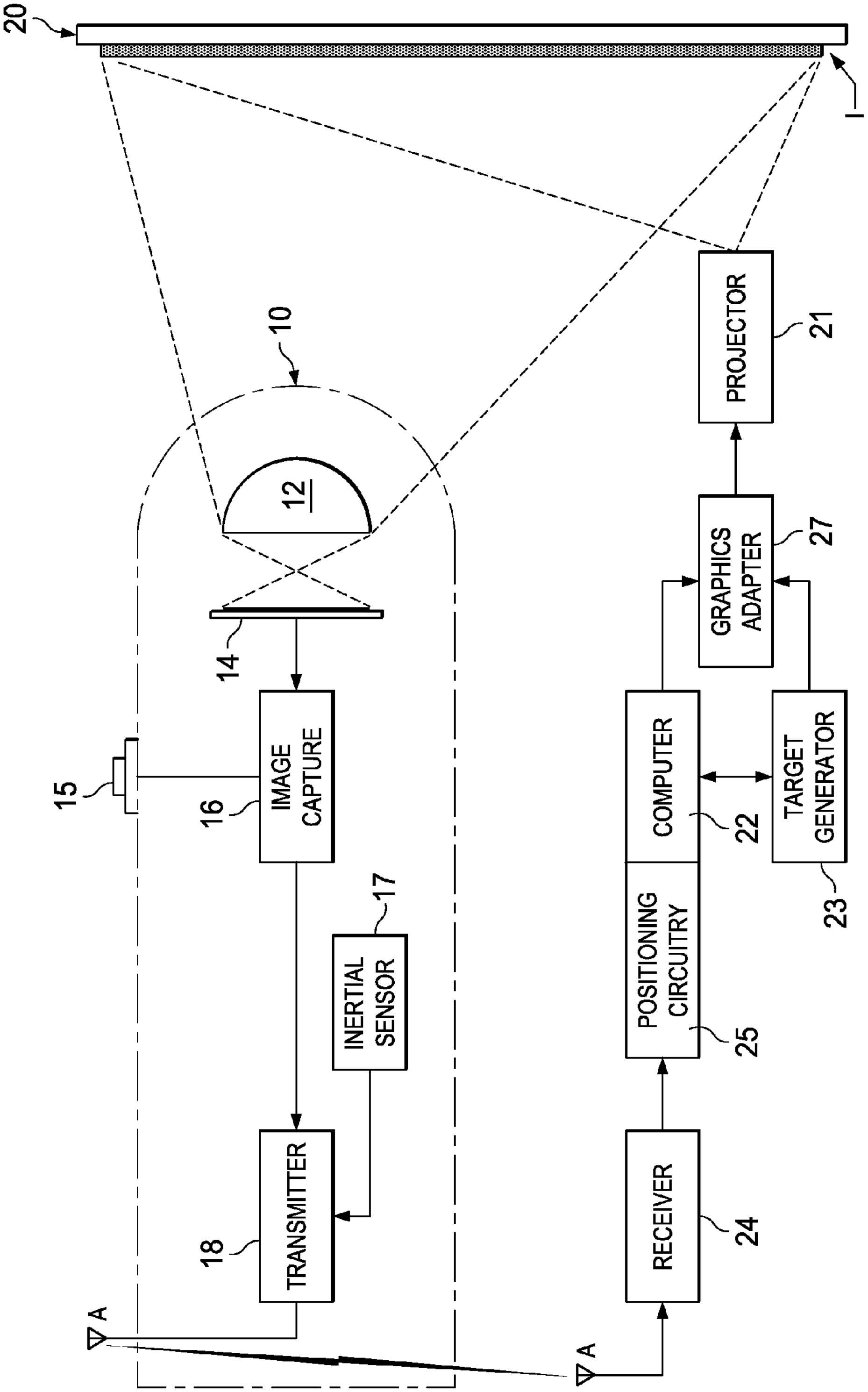
FIGS. 2*a* and 2*b* are electrical diagrams, in block form, each illustrating an interactive display system according to an embodiment of the invention.

Referring to FIG. 2*a*, a generalized example of the construction of an interactive display system useful in environments such as those shown in FIGS. 1*a* and 1*b*, according to embodiments of this invention, will now be described. As shown in FIG. 2*a*, this interactive display system includes pointing device 10, projector 21, and display screen 20. In this embodiment of the invention, computer 22 includes the appropriate functionality for generating the "payload" images to be displayed at display screen 20 by projector 21, such payload images intended for viewing by the audience. The content of these payload images is interactively controlled by a human user via pointing device 10, according to embodiments of this invention. To do so, computer 22 cooperates with positioning circuitry 25, which determines the position of display screen 20 to which pointing device 10 is pointing. As will become apparent from the following description, this positioning determination is based on pointing device 10 detecting one or more positioning targets displayed at display screen 20.

In its payload image generation function, computer 22 will generate or have access to the visual information to be displayed (i.e., the visual "payload" images), for example in the form of a previously generated presentation file stored in memory, or in the form of active content such as computer 22 may retrieve over a network or the Internet; for a "white board" application, the payload images will include the inputs provided by the user via pointing device 10, typically displayed on a blank background. This human-visible payload image frame data from computer 22 will be combined with positioning target image content generated by target generator function 23 that, when displayed at graphics display 20, can be captured by pointing device 10 and used by positioning circuitry 25 to deduce the location pointed to by pointing device 10. Graphics adapter 27 includes the appropriate functionality suitable for presenting a sequence of frames of image data, including the combination of the payload image data and the positioning target image content, in the suitable display format, to projector 21. Projector 21 in turn projects the corresponding images I at display screen 20, in this projection example.

The particular construction of computer 22, positioning circuitry 25, target generator circuitry 23, and graphics adapter 27 can vary widely. For example, it is contemplated that a single personal computer or workstation (in desktop, laptop, or other suitable form), including the appropriate processing circuitry (CPU, or microprocessor) and memory, can be constructed and programmed to perform the functions of generating the payload images, generating the positioning target, combining the two prior to or by way of graphics adapter 27, as well as receiving and processing data from pointing device 10 to determine the pointed-to location at the displayed image. Alternatively, it is contemplated that separate functional systems external to computer 22 may carry out one or more of the functions of target generator 23, receiver 24, and positioning circuitry 25, such that computer 22 can be realized as a conventional computer operating without modification; in this event, graphics adapter 27 could itself constitute an external function (or be combined with one or more of the other functions of target generator 23, receiver 24, and positioning circuitry 25, external to computer 22), or alternatively be realized within computer 22, to which output from target generator 23 is presented. Other various alternative implementations of these functions are also contemplated. In any event, it is contemplated that computer 22, positioning circuitry 25, target generator 23, and other functions involved in the generation of the images and positioning targets displayed at graphics display 20, will include the appropriate program memory in the form of computer-readable media storing computer program instructions that, when executed by its processing circuitry, will carry out the various functions and operations of embodiments of the invention as described in this specification. It is contemplated that those skilled in the art having reference to this specification will be readily able to arrange the appropriate computer hardware and corresponding computer programs for implementation of these embodiments of the invention, without undue experimentation.

Pointing device 10 in this example includes a camera function consisting of optical system 12 and image sensor 14. With pointing device 10 aimed at display 20, image sensor 14 is exposed with the captured image, which corresponds to all or part of image I at display 20, depending on the distance between pointing device 10 and display 20, the focal length of lenses within optical system 12, and the like. Image capture subsystem 16 includes the appropriate circuitry known in the art for acquiring and storing a digital representation of the captured image at a particular point in time selected by the user, or as captured at each of a sequence of sample times. Pointing device 10 also includes actuator 15, which is a conventional push-button or other switch by way of which the user of pointing device 10 can provide user input in the nature of a mouse button, to actuate an image capture, or for other functions as will be described below and as will be apparent to those skilled in the art. In this example, one or more inertial sensors 17 are also included within pointing device 10, to assist or enhance user interaction with the displayed content; examples of such inertial sensors include accelerometers, magnetic sensors (i.e., for sensing orientation relative to the earth's magnetic field), gyroscopes, and other inertial sensors.

In this example of FIG. 2*a*, pointing device 10 is operable to forward, to positioning circuitry 25, signals that correspond to the captured image acquired by image capture subsystem 16. This communications function is performed by wireless transmitter 18 in pointing device 10, along with its internal antenna A, by way of which radio frequency signals (e.g., according to a conventional standard such as Bluetooth or the appropriate IEEE 802.11 standard) are transmitted. Transmitter 18 is contemplated to be of conventional construction and operation for encoding, modulating, and transmitting the captured image data, along with other user input and control signals via the applicable wireless protocol. In this example, receiver 24 is capable of receiving the transmitted signals from pointing device 10 via its antenna A, and of demodulating, decoding, filtering, and otherwise processing the received signals into a baseband form suitable for processing by positioning circuitry 25.

It is contemplated that the particular location of positioning circuitry 25 in the interactive display system of embodiments of this invention may vary from system to system. It is not particularly important, in the general sense, which hardware subsystem (i.e., the computer driving the display, the pointing device, a separate subsystem in the video data path, or some combination thereof) performs the determination of the pointed-to location at display 20. In the example shown in FIG. 2*a*, as described above, positioning circuitry 25 is deployed in combination with computer 22 and target generator function 23, in a system that combines the functions of generating the displayed images I and of determining the location at the displayed images I at which pointing device 10 is aimed (and decoding the commands associated therewith) into the same element of the system.

Figure 2B:
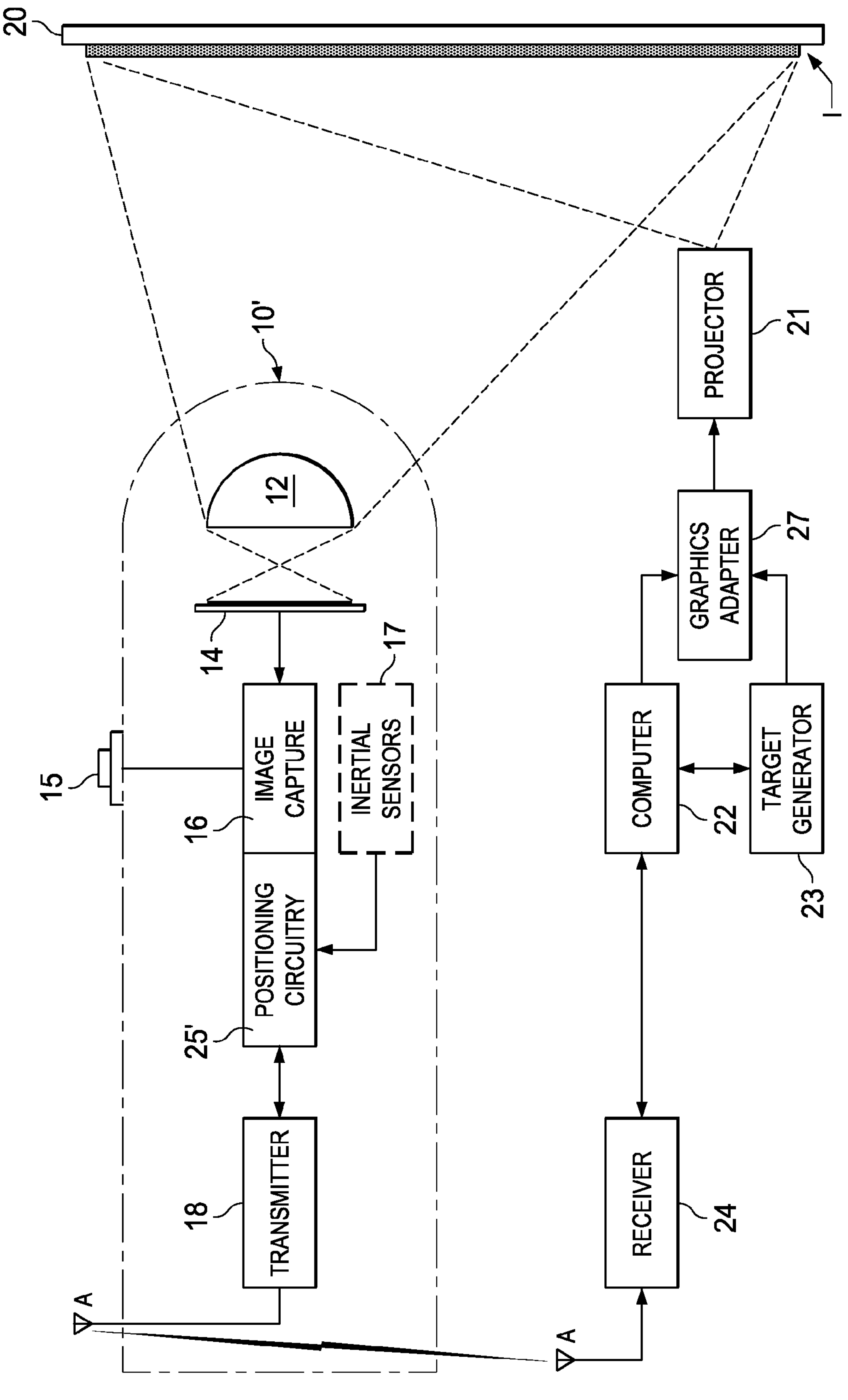

FIG. 2*b* illustrates an alternative generalized arrangement of an interactive display system according to embodiments of this invention. This system includes projector 21 and display 20 as in the example of FIG. 2*b*, with projector 21 projecting payload image content and positioning target image content generated by computer 22 as described above. In this example, pointing device 10' performs some or all of the computations involved in determining the location at display 20 at which it is currently pointing. As such, in addition to a camera (lens 12, image sensor 14, and image capture 16), positioning device 10' includes positioning circuitry 25', along with wireless transmitter 18. Conversely, computer 22 is coupled to receiver 24, as before. Alternatively, transmitter 18 and receiver 24 may be each be implemented as transceivers, capable of both receiving and transmitting wireless communications with one another, in which case data corresponding to the size, shape, and position of the positioning targets as displayed at display 20 can be transmitted to pointing device 10' for comparison.

In either case, positioning circuitry 25, 25' (hereinafter referred to generically as positioning circuitry 25) determines the location at display 20 at which pointing device 10, 10' (hereinafter referred to generically as pointing device 10) is aimed, as will be described in detail below. As described in the above-incorporated U.S. Pat. No. 8,217,997, positioning circuitry 25 performs "absolute" positioning, in the sense that the pointed-to location at the display is determined with reference to a particular pixel position within the displayed image. As described in U.S. Pat. No. 8,217,997, image capture subsystem 16 captures images from two or more frames, those images including one or more positioning targets that are presented as patterned modulation of the intensity (e.g., variation in pixel intensity) in one display frame of the visual payload, followed by the same pattern but with the opposite modulation in a later (e.g., the next successive) frame.

Figure 3A:
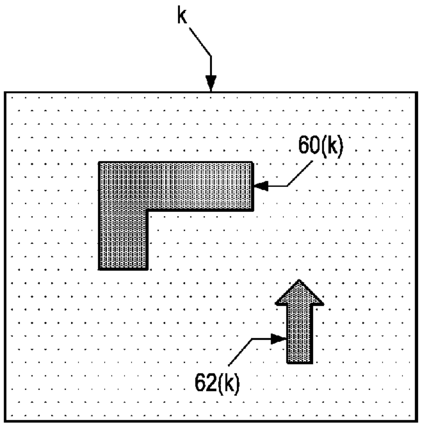
FIGS. 3*a* through 3*d* are views of a display illustrating the operation of a visual absolute positioning system in which embodiments of the invention may be implemented.
Figure 3B:
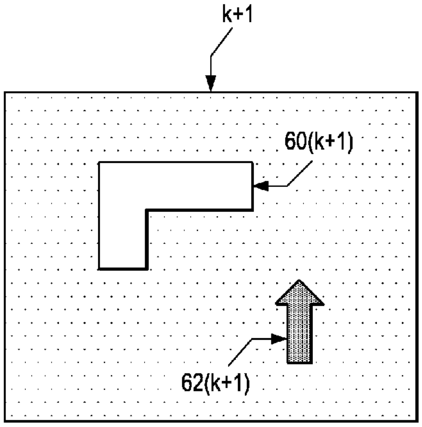

FIGS. 3*a* through 3*d* illustrate an example of absolute positioning as carried out by positioning circuitry 25, for the case in which pointing device 10 is not in motion. FIG. 3*a* illustrates an image generated by computer 22 and target generator 23, displayed via graphics adapter 27 at display 20, and captured by the field of view of image capture subsystem 16 in frame k. In this example, the image contains positioning target 60(*k*) and visible element 62(*k*), each of which is darker than the background in the captured image. FIG. 3*b* illustrates the image generated and displayed in the next displayed frame k+1, and captured by image capture subsystem 16, that image including positioning target 60(*k*) and visible element 62(*k*). Because pointing device 10 has not moved between the times of frames k, k+1, positioning targets 60(*k*), 60(*k*+1) are in the same position in the images of both frames, as are visible elements 62(*k*), 62(*k*+1) relative to one another. As described in the above-incorporated U.S. Pat. No. 8,217,997, positioning target 60(*k*+1) is brighter than the background in frame k+1 by an amount that is about the same as positioning target 60(*k*) is darker than the background in frame k. Visible elements 62(*k*), 62(*k*+1) are darker than the background in both frames, as shown.

Figure 3C:
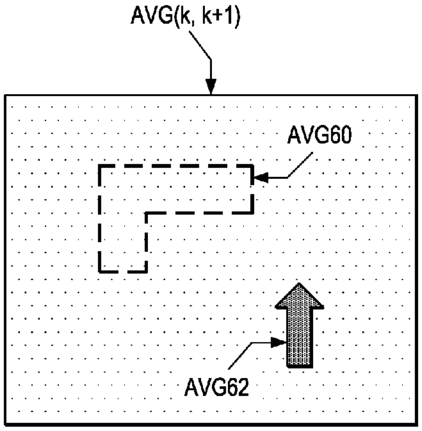

FIG. 3*c* illustrates the captured image portions of FIGS. 3*a* and 3*b* averaged with one another, for example as is naturally done by humans viewing the sequence of images at display 20. Because positioning targets 60(*k*), 60(*k*+1) are in the same location for both frames k, k+1, but modulate the background in a manner complementary to one another, the average image AVG60 of the two positioning targets 60(*k*), 60(*k*+1) is simply the background level of the displayed image, with no visible modulation (as suggested in FIG. 3*c* by the dashed lines at location AVG60). On the other hand, the average frame AVG (k, k+1) of frames k, k+1 results in darker element AVG62 relative to the background. Element 62 is thus visible, and positioning target 60 is invisible, to humans in the audience of display 20, as intended.

Figure 3D:
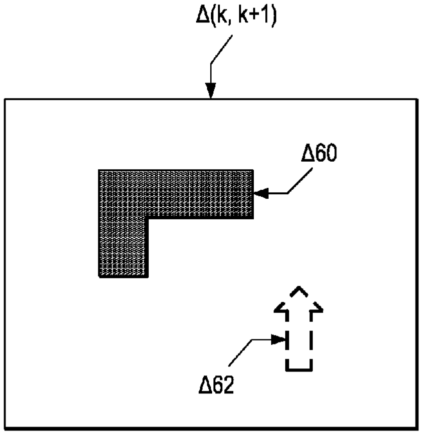

According to the approach described in U.S. Pat. No. 8,217,997, positioning circuitry 25 subtracts the captured image data from these two frames k, k+1 from one another. FIG. 3*d* illustrates difference frame Δ(k, k+1) resulting from such subtraction; as evident in FIG. 3*d*, the (constant) background image cancels out and is not visible. Similarly, elements 62(*k*), 62(*k*+1) cancel each other out in difference frame Δ(k, k+1), and as such element 62 is invisible for purposes of the positioning task, as indicated by difference element α62 of FIG. 3*d*. On the other hand, because positioning targets 60(*k*), 60(*k*+1) modulate the background in a manner complementary to one another, at the same location of the captured image for both of frames k, k+1, subtraction of the captured image of frame k+1 from that of frame k serves to reinforce the modulation, enabling the recovery of machine-visible positioning target pattern Δ60 as shown in FIG. 3*d*. As described in U.S. Pat. No. 8,217,997, positioning circuitry 25 is then able to determine location, size, and orientation from the location of positioning target pattern Δ60 in difference frame Δ(k, k+1), and thus identify the aiming point of pointing device 10 relative to display 20.

As evident from FIG. 3*a* through 3*d* and the above description, positioning circuitry 25 operates quite well in identifying human-invisible positioning targets 60 in the case in which pointing device 10 does not move significantly from the time of one frame to the time of the next. However, rapid inter-frame motion of pointing device 10 between frames will move the location of positioning target 60 within the captured image portion from one frame to the next. This movement has been observed to create difficulties in the absolute positioning determination, as will now be described in connection with FIGS. 4*a* through 4*d*.

Figure 4A:
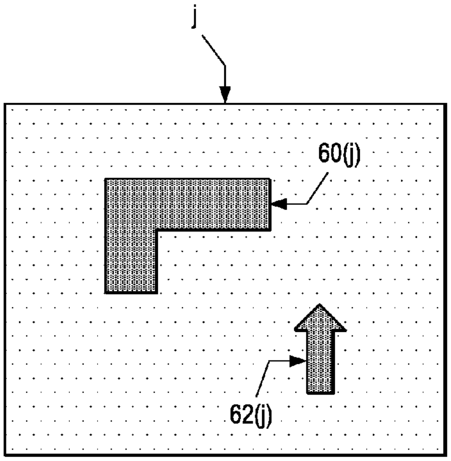
FIGS. 4*a* through 4*d* are views of a display illustrating the operation of a visual absolute positioning system in the context of relative motion, and in which embodiments of the invention may be implemented.
Figure 4B:
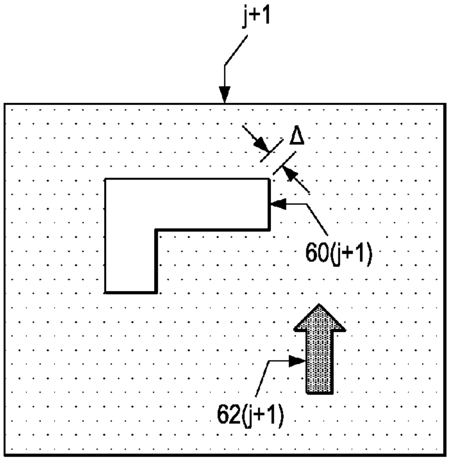

FIG. 4*a* illustrates an image generated by computer 22 and target generator 23, displayed via graphics adapter 27 at display 20, and captured by image capture subsystem 16, for a frame j containing positioning target 60(*j*) and visible element 62(*j*), each of which are darker than the background in the captured image. FIG. 4*b* illustrates the generated and displayed image, and captured by image capture subsystem 16 from the next displayed frame j+1, in which positioning target 60(*j*+1) and visible element 62(*j*+1) are within the field of view. As before, positioning target 60(*j*+1) is brighter than the background in frame j+1 by an amount that is about the same as positioning target 60(*j*) is darker than the background in frame j; visible elements 62(*j*), 62(*j*+1) are darker than the background in both frames, so as to be human-visible. In this example, however, because the user has moved pointing device 10 upward and to the left from the time of frame j to the time of frame j+1, positioning target 60(*j*+1) and visible element 62(*j*+1) appear in the captured image of frame j+1 at a location slightly down and to the right in its field of view, relative to the location of positioning target 60(*j*) and visible element 62(*j*) in frame j. In this example, the shift in position (i.e., magnitude and direction) is shown by vector Δ.

Figure 4C:
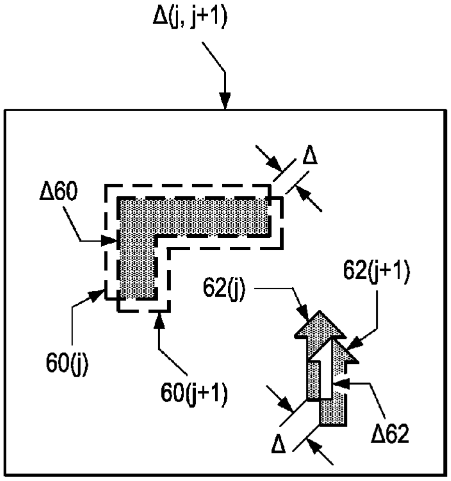

FIG. 4*c* illustrates difference frame Δ(j, j+1) corresponding to the results of the subtraction of the image data of frame j+1 from the image data of frame j in determining absolute position, as described in U.S. Pat. No. 8,217,997. Because pointing device 10 moved between the times of frames j, j+1, positioning targets 60(*j*), 60(*j*+1) and visible elements 62(*j*), 62(*j*+1) do not exactly overlap each other. As a result, positioning target pattern Δ60 is not of full size (i.e., is not of the same size as positioning target 60) and is distorted to some extent. The distortion of the shape of positioning target pattern Δ60, from its expected shape, will generally depend on the direction of movement of pointing device 10, and whether the attitude of pointing device 10 was changed by that movement. The ability of positioning circuitry 25 to properly identify the location of positioning target pattern Δ60 in the captured image is thus degraded by this motion of pointing device 10, perhaps so much so that a positioning target pattern cannot be recognized at all, rendering positioning circuitry 25 unable to accurately calculate the pointed-to location at display 20. In addition, because visible elements 62(*j*), 62(*j*+1) do not exactly overlap each other, the subtraction of the image data of frame j+1 from the image data of frame j shown in difference frame Δ(j, j+1) does not completely cancel out these elements 62. As shown in FIG. 4*c*, difference element α62 does not fully overlay visible elements 62(*j*), 62(*j*+1), leaving vestiges that remain visible to positioning circuitry 25 in difference frame Δ(j, j+1). These vestigial visible elements 62(*j*), 62(*j*+1) can complicate the absolute positioning determination, particularly if those vestiges somewhat resemble a feature of positioning target 60, or overlap and thus distort positioning target 60, in either case reducing the likelihood that positioning circuitry 25 recognizes a positioning target pattern and calculates an accurate position.

Figure 4D:
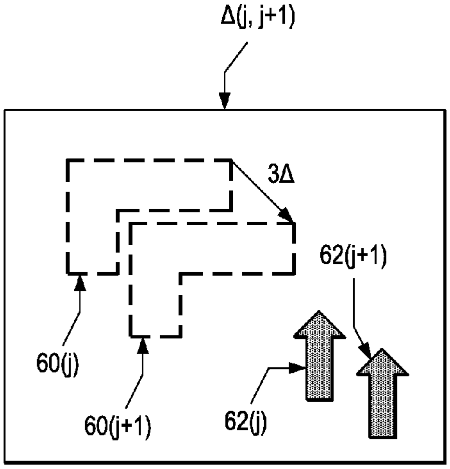

This issue is exacerbated by greater inter-frame motion, as shown in FIG. 4*d*. In this example, a more rapid movement of pointing device 10 between frames j, j+1 amounts to a shift shown by vector 3Δ (in the same direction but of three times the magnitude as vector Δ in FIGS. 4*b* and 4*c*) between the locations of positioning targets 60(*j*), 60(*j*+1) and visible elements 62(*j*), 62(*j*+1) in difference frame Δ(j, j+1) of FIG. 4*d*. This movement of 3Δ is sufficiently large that positioning targets 60(*j*), 60(*j*+1) do not overlap at all in difference frame Δ(j, j+1); as a result, no positioning target pattern Δ60 whatsoever can be detected. Similarly, visible elements 62(*j*), 62(*j*+1) do not overlap one another in the case of pointing device 10 movement of 3Δ, such that neither is cancelled out even in part, and both remain present to positioning circuitry 25 for purposes of its absolute positioning determination. Absolute positioning in this situation is thus at best rendered incorrect if it is based on the wrong visible elements, but at worst is impossible because no valid positioning target is detected.

This shrinking and distortion, if not elimination, of valid positioning target patterns according to this approach in the case in which the pointing device is moving, have been observed to cause increased computational load, cause positioning errors, and in some cases cause complete failure of the absolute positioning function. Embodiments of this invention address this issue, as will now be described.

According to embodiments of the invention, positioning circuitry 25 includes the capability of performing "relative" positioning of the location at display 20 pointed to by pointing device 10. As described in the above-incorporated U.S. patent application Ser. No. 14/018,695, relative positioning is the determination of a particular position with reference to a previous position. In the context of the interactive systems of FIGS. 2*a* and 2*b*, relative positioning is performed based on the motion of pointing device 10 from one position to another, for example between sample times. As known in the art and as mentioned above, relative positioning can be done at a relatively high rate as its computational requirements are typically not as significant as for absolute positioning, and is not necessarily constrained by the frame rate.

Because relative positioning is based on motion sensing, motion sensing capability is implemented in one or more various ways within pointing device 10, according to embodiments of the invention. One class of motion sensors is referred to in the art as inertial sensing, by way of which physical movement of the device is directly sensed; typically, inertial sensors are deployed for each of the three axes of movement. FIGS. 2*a* and 2*b* illustrate the optional implementation of inertial sensors 17 in pointing device 10, respectively. Examples of inertial sensors 17 that may be implemented according to embodiments of this invention include accelerometers, gyroscopes, and magnetic field sensors such as magnetometers. Alternatively, or in addition to inertial sensors 17, visual motion sensing may be performed by image capture subsystem 16 in pointing device 10. Various approaches to visual motion sensing are known in the art, such as object registration and other techniques used by conventional optical trackballs and mice, and the like.

As described in the above-incorporated U.S. patent application Ser. No. 14/018,695, the absolute and relative positioning results produced by positioning circuitry 25 in the system of FIGS. 2*a* and 2*b* are combined to produce a final positioning result. The rapid and frequent positioning enabled by relative motion sensing and positioning are combined with the precision of absolute positioning, providing improved positioning performance of the interactive display system.

Embodiments of this invention also utilize this relative motion sensing capability to assist in the rapid and accurate determination of absolute positioning in situations in which pointing device 10 is moving between the times of successive frames, particularly if the absolute positioning approach involves the subtraction of frame data to detect human-invisible positioning target patterns. The resulting improvement in the absolute positioning determination is synergistically beneficial in systems and methods utilizing the sensor fusion approach described in the above-incorporated U.S. patent application Ser. No. 14/018,695, as the absolute positioning results (which are improved by relative motion sensing) are used to compensate for error in the relative motion sensing itself.

Figure 5:
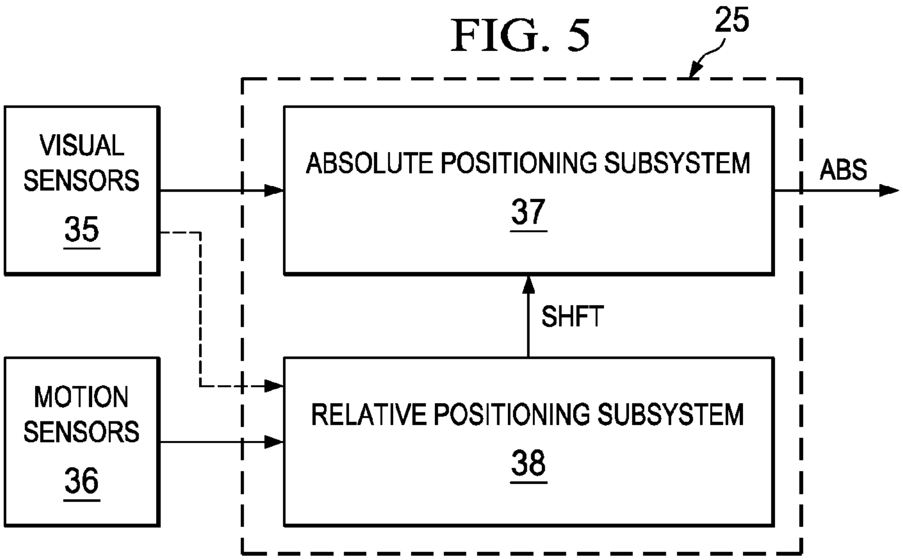
FIG. 5 is a functional diagram, in block form, illustrating the functional architecture of the positioning subsystems in an interactive display system according to embodiments of the invention.

According to embodiments of this invention, therefore, both absolute and relative positioning are performed and their results combined in a way that improves responsiveness and accuracy of the positioning in interactive display systems. FIG. 5 illustrates the functional or logical architecture of positioning circuitry 25. As mentioned above, it is contemplated that positioning circuitry 25 may be implemented in a variety of ways, including by way of programmable logic circuitry at or connected to computer 22, within pointing device 10, or a combination thereof. In implementations in which programmable logic circuitry realizes all or part of positioning circuitry 25, it is contemplated that positioning circuitry 25 would include or access the appropriate program memory for storing the program instructions that, when executed by the programmable logic circuitry, carry out the positioning operations described below. These operations are performed during such time as a sequence of images is presented by computer 22 at display 20 at a frame rate suitable for the display system.

FIG. 5 illustrates visual sensors 35 as coupled to absolute positioning subsystem 37 within positioning circuitry 25 according to this embodiment of the invention. In embodiments of this invention, visual sensors 35 correspond to image sensor 14 and image capture subsystem 16 (FIGS. 2*a* and 2*b*), which are operable to capture portions of images displayed at display 20, those portions including the positioning target image content, at each image capture time (e.g., periodically according to the frame rate of display 20). According to embodiments of this invention, as described above relative to FIGS. 3*a* through 3*d* and 4*a* through 4*d*, the positioning target image content may be "machine-visible" but human-invisible content, by way of which the pointed-to location at display 20 can be determined without disruption of the information displayed to the audience. The use of human-invisible content for positioning is particularly useful in "white board" applications. These image data for each image capture time are communicated to absolute positioning subsystem 37, for the absolute positioning determination of the location at display 20 at which pointing device 10 was aimed at the times that the images were captured.

Motion sensors 36 in the architecture of FIG. 5 correspond to those sensors within pointing device 10 that sense its motion, and communicate that sensed motion to relative positioning subsystem 38 for determination of a relative position of the pointed-to location at display 20. Referring to FIGS. 2*a* and 2*b*, motion sensors 36 may be implemented in the form of inertial sensors 17. Alternatively to or in combination with motion sensors 36, visual sensors 35 may operate to detect relative motion from image data captured from display 20. In this case, the sensing of relative motion may be performed by visual sensors 35 capturing and processing image data at or higher than the frame rate. This visual sensing of relative motion is indicated, in FIG. 5, by the optional connection of visual sensors 35 to relative positioning subsystem 38. In any case, referring to FIG. 5, either or both of motion sensors 36 or visual sensors 35 operate to obtain their measurements at various sample times, and communicate those measurements in the appropriate form to relative positioning subsystem 38, which operates to determine a change in position of the pointed-to location.

Relative positioning subsystem 38 may be realized by logic circuitry, including programmable logic circuitry executing program instructions stored in program memory within or accessible to positioning circuitry 25 that carry out the relative motion positioning, for example according to conventional algorithms for relative motion positioning, an example of which is referred to in the art as "object registration". It is contemplated that those skilled in the art having reference to this specification will be readily able to implement the program instructions or logic circuitry of relative positioning subsystem 38, in the manner best suited for a particular implementation, without undue experimentation. Particular examples of the determination of relative motion by relative positioning subsystem 38, and use of the relative positioning results in combination with the absolute positioning results from absolute positioning subsystem 37 by way of sensor fusion, are described in the above-incorporated U.S. patent application Ser. No. 14/018,695.

According to embodiments of this invention, relative positioning subsystem 38 communicates its relative positioning results, either directly or indirectly, to absolute positioning subsystem 37. FIG. 5 illustrates this communication as being carried out via signal lines SHFT between relative positioning subsystem 38 and absolute positioning subsystem 37. Other ways in which the relative motion results are communicated to absolute positioning subsystem 37 will be described in further detail below.

Figure 6:
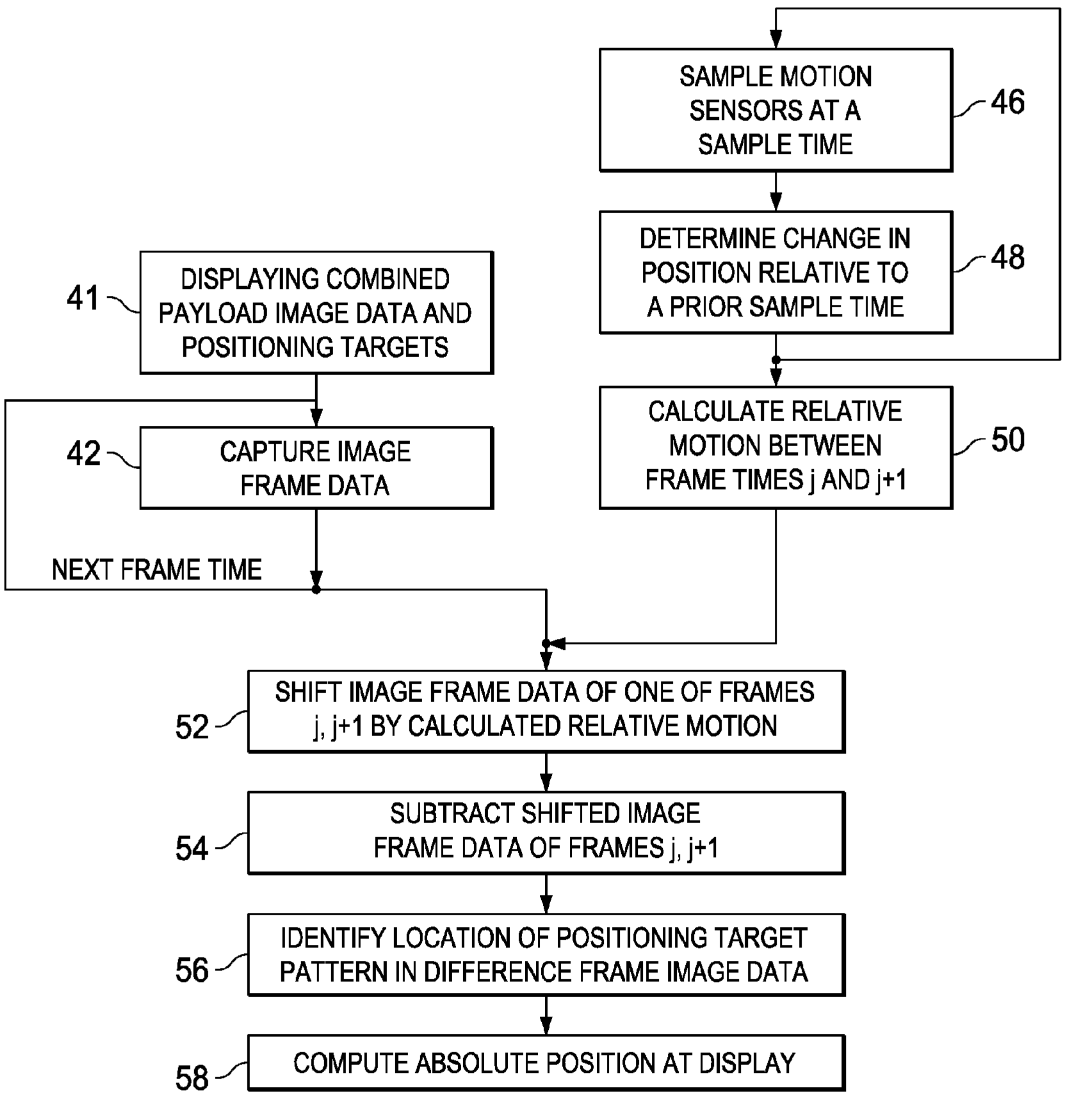
FIG. 6 is a flow diagram illustrating the operation of the architecture of FIG. 4 according to embodiments of the invention.

Referring now to FIG. 6, the operation of positioning circuitry 25 in utilizing relative motion to assist its absolute positioning function, according to embodiments of the invention, will be described in detail. In process 41, graphics adapter 27 and projector 21 (in the examples of FIGS. 2*a* and 2*b*) display payload image data combined with positioning target pattern images at display 20. The payload image data may include human-visible content, for example presentation slides, computer screens, and the like as useful in presentations; alternatively, the payload visual image data may simply be a blank "white board" on which the user may "write" or "draw", with only the sensed written or drawn content appearing on a neutral background, as known in the art. According to embodiments of this invention, the positioning target pattern images are in the form of complementary modulations of the payload or background image data in successive frames, as described in the above-incorporated U.S. Pat. No. 8,217,997.

In process 42, images at display 20 are periodically sensed by visual sensors 35 (i.e., image capture subsystem 16) at a sample rate generally corresponding to the frame rate of display 20. Meanwhile, in process 46, relative motion of pointing device 10 is periodically detected by motion sensors 36 or visual sensors 35, as the case may be. It is contemplated that the relative motion sampling in process 46, while generally periodic, may be asynchronous with, and at a significantly higher sampling frequency than, the image captures of process 42. In each case, however, it is contemplated that each sampled datum will be associated with a timestamp value to facilitate correlation between the absolute and relative measurements.

In process 48, relative positioning subsystem 38 determines a change in relative position of pointing device 10, as sensed by motion sensors 36 or visual sensors 35) in process 46, between sample times. It is contemplated that process 48 may be performed according to any one of a number of conventional techniques, depending of course on the type of motion sensors 36 deployed in pointing device 10 and on whether visual sensors 35 participate in the relative motion determination, as discussed above. In summary, if motion sensors 36 in pointing device 10 are used in the relative motion determination of process 48, this determination of relative motion will include transformation of the relative motion of pointing device 10 itself (i.e., the movement of the "body frame" of pointing device 10) into a distance in pixels of display 20. As described in the above-incorporated U.S. patent application Ser. No. 14/018,695, the distance from display 20 to pointing device 10 as determined by prior absolute positioning results (e.g., based on the size of the positioning targets in the field of view of image capture subsystem 16) may be used in transforming the body frame movement into the relative motion of the pointed-to location at display 20. Conversely, if visual sensors 35 are used in the relative motion determination, process 48 can be performed without conversion of body frame motion into pixel-based distances.

In process 50, relative positioning subsystem 38 calculates the relative motion of pointing device 10 between times at which images were captured by visual sensors 35 in a pair of frames displayed at display 20. In some embodiments of the invention, these two times will correspond to times in successive frames j, j+1 in which complementary positioning targets 60 are displayed and captured. If the two sampling types are in fact synchronous (e.g., relative motion is sensed at sampling times corresponding to image capture times within frames j, j+1), the calculation of the relative motion between these two frame times j, j+1 can be readily determined.

As mentioned above, however, it is contemplated that the relative motion sensing of process 46 could be asynchronous with the image capture times of process 42. In this case, an estimate of position at each of frame times j, j+1, as sensed by motion sensors 36, will be derived from motion sensed at sample times on either side of the image capture time. For example, process 50 may estimate the relative position at these two frame times using a linear temporal interpolation of the relative positions, or alternatively using a calculated velocity of the relative motion. These two approaches are described in the above-incorporated U.S. patent application Ser. No. 14/018,695. To summarize, linear temporal interpolation of a relative position relative position $(x_r(t_{IC}), y_r(t_{IC}))$ at an image capture time $t_{IC}$ between relative motion sensing sample times $t_1$, $t_2$ is determined in each of the x and y directions (dimensions), according to the difference in time between image capture time $t_{IC}$ and sample times $t_1$, $t_2$. In this embodiment of the invention, relative position $(x_r(t_{IC}), y_r(t_{IC}))$ is calculated in process 50 as:

$$x_r(t_{IC}) = \frac{x_r(t_1)\cdot(t_2 - t_{IC}) + x_r(t_2)\cdot(t_{IC} - t_1)}{t_2 - t_1}$$

$$y_r(t_{IC}) = \frac{y_r(t_1)\cdot(t_2 - t_{IC}) + y_r(t_2)\cdot(t_{IC} - t_1)}{t_2 - t_1}$$

where relative position $(x_r(t_1), y_r(t_1))$ is the sensed relative position at a sample time $t_1$, and relative position $(x_r(t_2), y_r(t_2))$ is the sensed relative position at a subsequent sample time $t_2$. This calculation in process 50 determines the relative position $(x_r(t_{IC}), y_r(t_{IC}))$ at image capture time $t_{IC}$ as the linear average of the two relative positions, weighted by the time differences between the image capture time and the two relative position sample times. This approach can be considered as most accurate if the time duration between relative motion sample times $t_1$, $t_2$ is short (such that the motion between those two sample times is over a short distance), or if the motion over that interval is linear and at a constant velocity.

According to the velocity-based approach useful in process 50, a velocity vector at the sample time nearer to image capture time $t_{IC}$ is used to estimate a determination of the relative position $(x_r(t_{IC}), y_r(t_{IC}))$ at image capture time $t_{IC}$ based on the velocity of the motion sensed by motion sensors 36. For example, if image capture time $t_{IC}$ is closer to sample time $t_1$ than to sample time $t_2$, a vector of the velocity of motion of the pointed-to location at display 20 at sample time $t_1$ is determined. If acceleration is measured by accelerometers of motion sensors 36, this velocity vector can be determined by a single integration operation. This velocity vector includes two velocity components $v_x(t_1)$, $v_y(t_1)$ in the x and y directions, respectively. Based on those velocity components, relative position $(x_r(t_{IC}), y_r(t_{IC}))$ at image capture time $t_{IC}$ can be readily calculated:

$$x_r(t_{IC})=x_r(t_1)+v_x(t_1)\cdot(t_{IC}-t_1)$$

$$y_r(t_{IC})=y_r(t_1)+v_y(t_1)\cdot(t_{IC}-t_1)$$

for the case in which image capture time $t_{IC}$ is closer to sample time $t_1$ than to sample time $t_2$. For the case in which image capture time $t_{IC}$ is closer to sample time $t_2$ than to sample time $t_1$, a velocity vector at sample time $t_2$, with components $v_x(t_2)$, $v_y(t_2)$, is determined and used to perform the interpolation of relative position $(x_r(t_{IC}), y_r(t_{IC}))$ at image capture time $t_{IC}$ from:

$$x_r(t_{IC})=x_r(t_2)-v_x(t_2)\cdot(t_2-t_{IC})$$

$$y_r(t_{IC})=y_r(t_2)-v_y(t_2)\cdot(t_2-t_{IC})$$

Further in the alternative, the velocity vector may be determined from an average of the velocity vectors at sample times $t_1$ and $t_2$; this average velocity may be weighted, if desired, based on the proximity of the image capture time $t_{IC}$ to one or the other of those sample times $t_1$, $t_2$.

Whether based on a linear interpolation or on a velocity-based interpolation, an interpolated relative position $(x_r(t_{IC}), y_r(t_{IC}))$ value is calculated for image times $t_{IC}$ in both of frames j and j+1. As mentioned above, these approaches to interpolating the relative positions as sensed by motion sensor 36 to an image capture time are described in further detail in the above-incorporated U.S. patent application Ser. No. 14/018,695.

In any case, process 50 is completed by relative positioning system 38 calculating the motion of the pointed-to location of display 20, between the image capture time in frame j and the image capture time in frame j+1 at which image frame data was acquired in instances of process 42. This calculated motion will closely approximate the relative movement of positioning targets and visible elements in the captured image frame data. Of course, the polarity of the motion calculated in process 50 will be inverted as necessary to correspond to the movement of display elements (i.e., the direction of movement of the pointed-to location at display 20 is opposite from the direction of movement of pointing device 10).

The relative motion between frame times j and j+1 as determined in process 50 is then available for aligning, or registering, elements in the captured image data from those two frames. Referring to FIG. 4, this relative motion is communicated by relative positioning subsystem 38 to absolute positioning subsystem 37 via signal lines SHFT. In process 52, absolute positioning subsystem 38 uses the relative motion communicated on lines SHFT to align the image frame data of frames j, j+1 with one another. For the example of FIGS. 4*a* through 4*c*, as applied to determine the absolute position of the pointed-to location at display 20 in frame j, the captured image data in frame j+1 will be shifted up and to the left by a magnitude and direction corresponding to the vector −Δ (i.e., the negative of vector Δ shown in FIGS. 4*b* and 4*c*). More specifically, positioning target 60(*j*+1) and visible element 62(*j*+1) will shifted in each of the x and y directions by amounts corresponding to the components of vector −Δ. Conversely, if process 52 is to determine the absolute position of the pointed-to location at display 20 in frame j+1, positioning target 60(*j*) and visible element 62(*j*) in the captured image data of frame j will be shifted down and to the right by a magnitude and direction corresponding to the sum of components of vector −Δ. Further in the alternative, if the absolute position to be determined is at the midpoint or at another time between the image capture times $t_{IC}$ for frames j, j+1, positioning targets 60(*j*), 60(*j*+1) and visible elements 62(*j*), 62(*j*+1) in the captured image data of both of frames j, j+1 will be shifted, in process 50, toward one another by fractions of the magnitude and in the directions of the vectors Δ (for frame j) and −Δ (for frame j+1). In any case, the operation of process 52 serves to align positioning targets 60(*j*), 60(*j*+1) with one another, and visible elements 62(*j*), 62(*j*+1) with one another.

Figure 7:
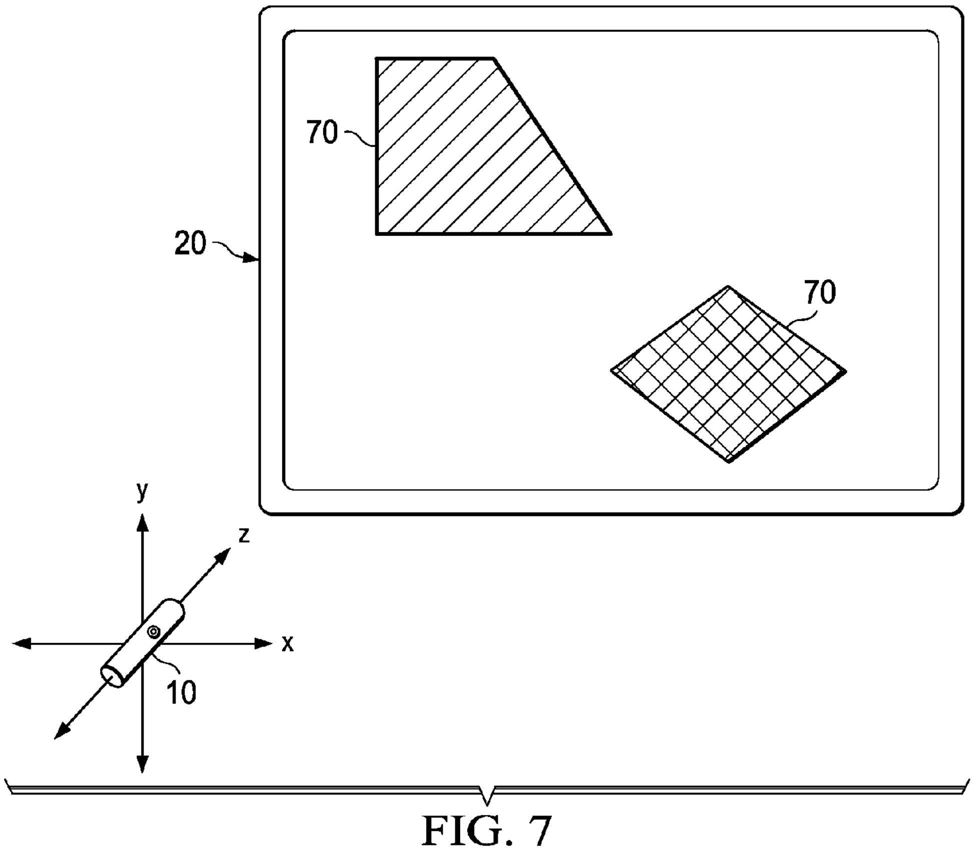
FIG. 7 is a perspective view of the orientation axes of a pointing device as used in the cooperation between absolute and relative positioning according to an embodiment of the invention.

It is contemplated that, in addition to the magnitude and direction of movement of the pointed-to location at display 20 between frames, movement of the body frame of pointing device 10 in other respects may also be incorporated into the alignment process 52. Referring to FIG. 7, pointing device 10 is shown as viewing elements 70 at display 20 at a given point in time. If pointing device 10 is moved toward or away from display 20 (i.e., along the z axis that is normal to the plane of display 20) during the time between image capture times, motion sensors 36 (and also visual sensors 35 if used in the relative motion determination) will sense that motion. Such motion along the z axis will cause elements 70 in the captured image data to exhibit a change in size from frame to frame.

Similarly, conventional inertial sensors serving as motion sensors 36 are typically capable of sensing roll, pitch, and yaw movement of pointing device 10, and that change in attitude can be analyzed by relative positioning subsystem 38. In the context of FIG. 7, roll refers to rotation of pointing device 10 about the z axis, i.e. the axis normal to display 20, and the longitudinal axis of pointing device 10 when it is pointed directly at display 20 in the manner shown in FIG. 7. Pitch refers to rotation of pointing device 10 about the x axis, which is the horizontal axis parallel to the plane of display 20 in this example. Similarly, yaw refers to rotation of pointing device 10 about the y axis, which is the vertical axis parallel to the plane of display 20 in this example. In general, pointing device 10 will be in an attitude in which each of roll, pitch, and yaw are non-zero. If the user moves pointing device so as to cause changes in roll, pitch, and yaw, such movement will also be reflected in differences in the orientation and shape of elements 70 in the image frame data captured by image capture subsystem 16 in successive frames j, j+1.

According to some embodiments of the invention, changes in the appearance of elements 70 (including positioning targets 60) caused by roll, pitch, yaw, and linear movement normal to display 20 (i.e., along the z axis), in combination with linear motion in the x and y directions as described above, can be taken into account by alignment process 52. If linear motion in the z direction is detected by relative positioning subsystem 38 based on inputs from motion sensors 36, positioning targets 60 and visible elements 62 in the captured image data from either or both of frames j, j+1 will be scaled in size according to the sensed linear z motion. If roll of pointing device 10 about the z axis between the image capture times of frames j, j+1 is detected by relative positioning subsystem 38, alignment process 52 will include rotation of the captured image data from either or both of frames j, j+1 to align positioning targets 60 and visible elements 62 with one another. If pitch or yaw of pointing device 10 between the image capture times of frames j, j+1 is detected by relative positioning subsystem 38, alignment process 52 will skew the captured image data from either or both of frames j, j+1 to correct for distortion accordingly (such skewing sometimes referred to in the art as "keystoning", particularly when correcting for trapezoidal distortion of rectangular objects), so that the shape of positioning targets 60 and visible elements 62 will better match one another despite a change in attitude of pointing device 10 over that time interval.

In any case, following alignment process 52, positioning targets 60(*j*), 60(*j*+1) will closely overlay one another, as will visible elements 62(*j*), 62(*j*+1) relative to one another. Absolute positioning subsystem 37 can then perform subtraction process 54 in the manner described in the above-incorporated U.S. Pat. No. 8,217,997, for example subtracting the processed image frame data of frame j+1 from that of frame j, such that the complementary modulation of positioning targets 60(*j*), 60(*j*+1) will reinforce each other as shown in FIG. 3*d*, with the background image data and visible elements 62(*j*), 62(*j*+1) in the two frames j, j+1 canceling out. Process 56 is then performed by absolute positioning subsystem 37 to identify the location of the positioning target pattern in the difference frame image data, following which the absolute location of the pointed-to location at display 20 can be determined in process 58, both in the manner as described in the above-incorporated U.S. Pat. No. 8,217,997.

According to this embodiments of this invention, therefore, positioning circuitry 25 can determine the location at display 20 pointed to by pointing device 10 in a precise and accurate manner, using positioning targets and images that are invisible to the human audience and thus suitable for use in "white board" applications, even in situations in which the user is moving pointing device 10 at a velocity and over a distance that is significant relative to the frame rate of the system. It is contemplated that this compensation for motion as applied to the absolute positioning process will significantly improve the operation of the interactive display system, as well as the experience provided to the audience.

Figure 8:
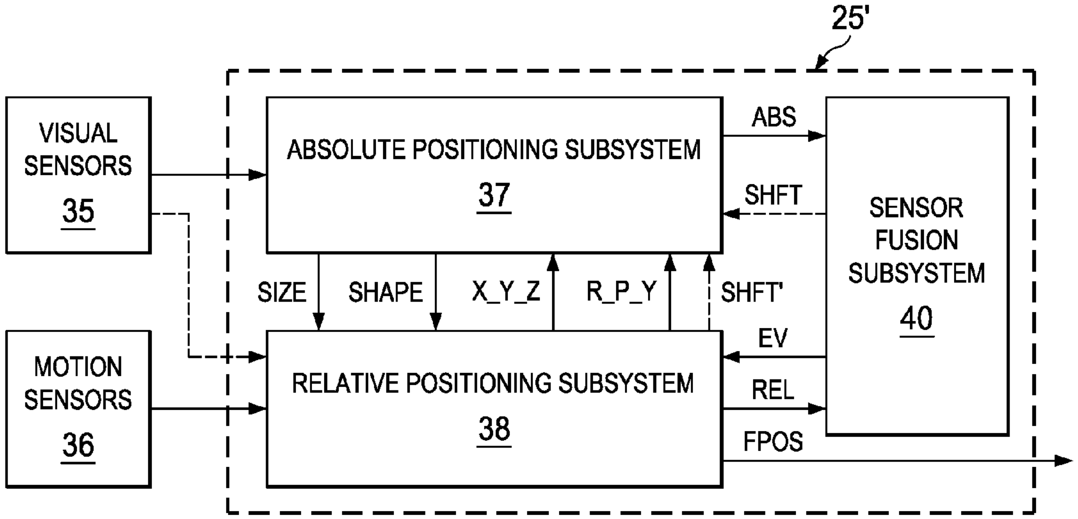
FIG. 8 is a functional diagram, in block form, illustrating the functional architecture of the positioning subsystems in an interactive display system according to an alternative embodiment of the invention.

As mentioned above, the above-incorporated U.S. patent application Ser. No. 14/018,695 describes a system and method in which the absolute and relative positioning results produced by positioning circuitry 25 in the system of FIGS. 2*a* and 2*b* are combined to produce a final positioning result. FIG. 8 illustrates, in block diagram form, the construction of positioning circuitry 25' according to the approach described in U.S. patent application Ser. No. 14/018,695, and according to an embodiment of the invention. In this embodiment of the invention as shown in FIG. 8, sensor fusion subsystem 40 determines an error value EV corresponding to a difference between the position of display 20 at which pointing device 10 was aimed at a particular point in time as determined by absolute positioning system 37, and that position as determined by relative positioning subsystem 38 for that same point in time. As described in U.S. patent application Ser. No. 14/018,695, it is contemplated that sensor fusion subsystem 40 may be implemented as logic circuitry, including programmable logic circuitry executing program instructions stored in program memory within or accessible to positioning circuitry 25 that carry out the operations and functions for producing error value EV based on absolute positioning signal ABS from absolute positioning subsystem 38, and on relative positioning signal REL from relative positioning subsystem 38. This error value EV is communicated by sensor fusion subsystem 40 back to relative positioning subsystem 38, which applies a compensation factor corresponding to that error value EV to the result of its relative positioning process, thus enabling the rapid and frequent positioning of the location at display 20 pointed to by pointing device 10 that relative positioning provides, but with an accuracy based on the precise results provided by absolute positioning.

As shown in FIG. 8 and as described in the above-incorporated U.S. patent application Ser. No. 14/018,695, absolute positioning subsystem 37 also communicates signals SIZE, SHAPE directly to relative positioning subsystem 38. Signals SIZE and SHAPE indicate changes in size and shape, respectively, of the positioning target or another displayed element over the relative time interval. These indications of changes in size and shape can assist the determination of distance and angle, respectively, of pointing device 10 in the relative motion positioning carried out by subsystem 38. This assistance can be in the nature of a confirmation of the sensed relative motion, or alternatively to speed up the relative positioning calculations by narrowing the necessary analysis to be performed by relative positioning subsystem 38. In addition, also as shown in FIG. 8 and as described in the above-incorporated U.S. patent application Ser. No. 14/018,695, signals R_P_Y and X_Y_Z are communicated directly from relative positioning subsystem 38 to absolute positioning subsystem 37, to assist in its calculations. Specifically, signals R_P_Y indicate roll, pitch, and yaw movement of pointing device 10, which are directly detectable by motion sensors 36 as analyzed by relative positioning subsystem 38, and signals X_Y_Z indicate linear motion along the x, y, and z axes, respectively. Changes in roll, pitch, and yaw, and linear motion along each of the three axes, can be helpful in the absolute positioning calculations, as the attitude of pointing device 10 is indicative of the location at display 20 at which it is pointing.

According to this embodiment of the invention, sensor fusion subsystem 40 also produces signals SHFT corresponding to the sensed and calculated relative motion between frames in which image capture subsystem 16 acquires image frame data applied for the absolute positioning determination. In this regard, sensor fusion subsystem 40 generates these signals SHFT based on the relative motion determination according to the process described above, followed by transformation of that relative motion expressed as a distance moved and change in attitude of pointing device 10, into relative motion expressed as movement of the location at display 20 pointed to by pointing device 10, for example as numbers of pixels in the x and y directions. Alternatively, as shown in FIG. 8, signals SHFT' corresponding to the sensed and calculated relative motion between frames (converted from a physical motion into motion in pixels) may be instead or additionally communicated to absolute positioning system 37 from relative positioning subsystem 38. In addition, in some embodiments of the invention, it is contemplated that the relative motion between those frame times as generated by relative positioning subsystem 38 in the manner described above is based on those relative positioning results as compensated according to error value EV as generated by sensor fusion subsystem 40, such that signals SHFT, SHFT' corresponding to the sensed and calculated relative motion between those frame times are themselves compensated in that manner. Such compensation is contemplated to further improve the accuracy with which positioning targets 60 are aligned with one another in many situations to improve the probability of positioning target pattern detection, while reducing noise and possible errors stemming from the "fixed" (i.e., human-visible) visual elements at display 20.

As mentioned above, relative positioning subsystem 36 may perform its function in response to data and signals from visual sensors 35, namely image capture subsystem 16. In this approach, captured image data is analyzed to determine the movement of elements in the displayed images, from which relative positioning subsystem 38 can deduce a new position of the pointed-to location relative to a previous location. For example, if pointing device 10 in FIG. 7 moves its pointed-to location toward the upper left-hand corner of display 20, elements 70 will appear to move down and to the right in the captured image data, relative to a previously captured image. The new pointed-to location can be determined from this detected relative motion, for example by way of known algorithms such as object registering, and other conventional algorithms known in the art, such as KLT, SURF, SIFT, and ORB.

However, it has been observed, in connection with this invention, that the ability of such visual relative motion sensing to identify displayed elements is rendered difficult in some situations because of the nature of the displayed content. One such difficult situation is the "white board" context in which display 20 is at a single color (e.g., a neutral color, including white), such that no displayed elements are visible.

Another situation in which visual relative motion sensing is rendered difficult is presented in connection with the human-invisible positioning targets as used in connection with embodiments of this invention. As described above, for example with reference to FIGS. 3*a* and 3*b*, positioning targets 60 in alternating frames (i.e., every other frame) are displayed by way of incrementally lighter modulation of the background image. Positioning target 60(*k*+1) is an example of such an incrementally lighter positioning target. As summarized above, visual relative motion sensing operates by detecting a change in position of corresponding displayed elements between sample times in successive frames. It has been observed, in connection with this invention, that because these incrementally lighter positioning targets such as positioning target 60(*k*+1) differ in "color" from the corresponding darker positioning targets such as positioning target 60(*k*) in adjacent frames, many visual relative motion algorithms may not recognize positioning target 60(*k*+1) as the "same" feature as positioning target 60(*k*) and vice versa. This inability to identify some of the displayed elements in the captured frame data from successive frames as corresponding to one another may, in some situations, significantly and negatively impact the relative motion sensing results.

According to another embodiment of the invention, positioning circuitry 25 operates to use visual relative motion sensing to facilitate its absolute positioning function, particularly in such situations in which positioning target elements in some frames are not necessarily "visible" or otherwise useful to relative positioning subsystem 38. In particular, this embodiment of the invention estimates motion from one frame to a next frame, in order to shift or align image frame data for the two frames, from motion that is visually sensed as occurring over two frame times. In this manner, the locations of the same positioning target patterns that are displayed in alternating frames k, k+2 will be compared, even for the case in which human-invisible positioning targets are generated using complementary modulation in successive frames. The operation of positioning circuitry 25 in this manner, according to this embodiment of the invention, will now be described in detail with reference to FIG. 9.

Figure 9:
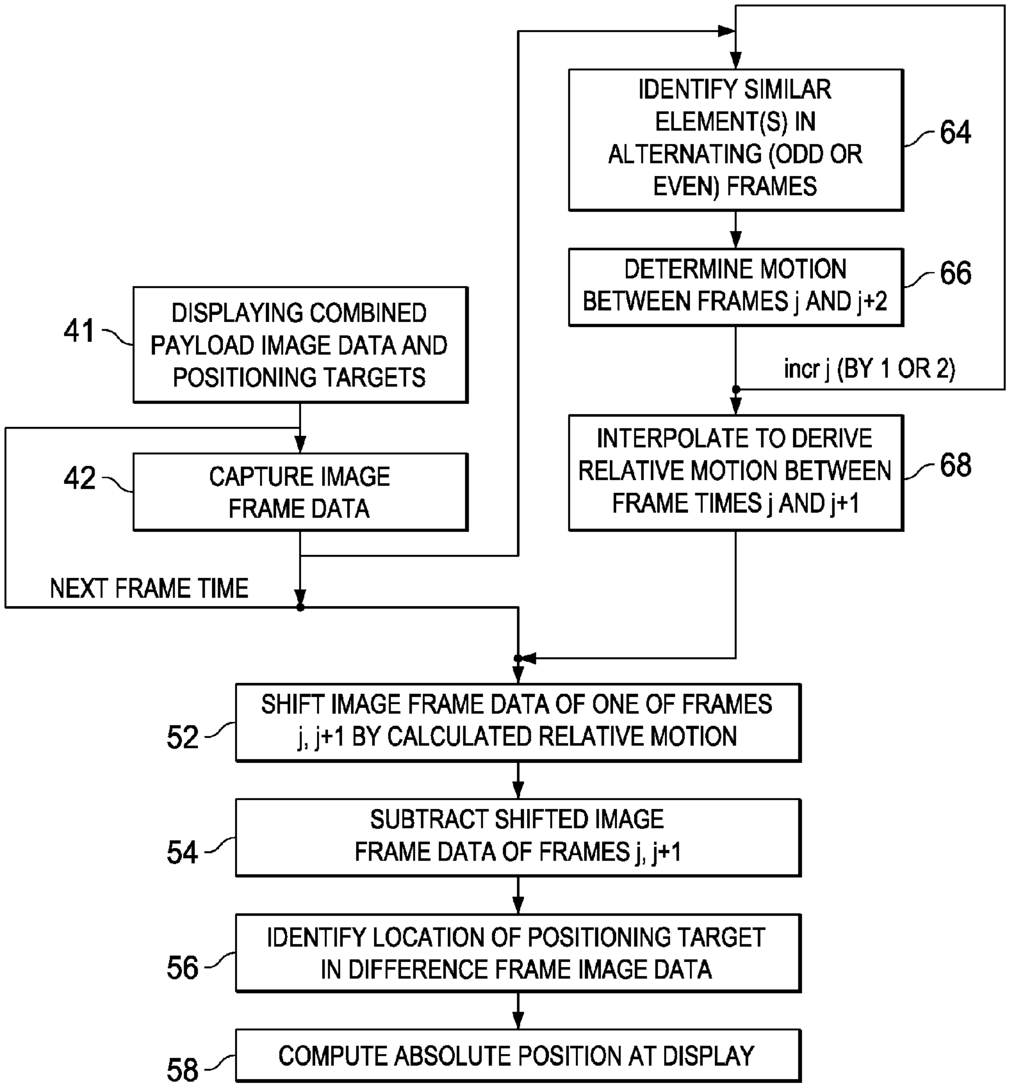
FIG. 9 is a flow diagram illustrating the operation of the architecture of FIG. 4 according to an alternative embodiment of the invention.

The operation of positioning circuitry 25 summarized in FIG. 9 is similar to that described above relative to FIG. 6; as such, similar processes will be referred to by the same reference numerals in both of FIGS. 6 and 9. As described above, payload visual image data, combined with positioning target pattern images in the form of complementary modulations of the payload or background image data in successive frames are projected to or otherwise displayed by display 20, in process 41. The displayed positioning target pattern images correspond to positioning targets 60(*k*), 60(*k*+1) of FIGS. 4*a* and 4*b*, in the form of elements displayed with complementary modulation of the background (i.e., payload) image in successive frames k, k+1. Of course, the complementary modulation continues for frames following frame k+1, with positioning target 60(*k*+2) in frame k+2 appearing as incrementally darker modulation of the background image, positioning target 60(*k*+3) in frame k+3 appearing as incrementally brighter modulation of the background image, and so on. As such, positioning targets 60 in even-numbered alternating frames (i.e., k, k+2, k+4, k+6, etc.) will appear as incrementally darker modulation of the background, while positioning targets 60 in odd-numbered alternating frames (i.e., k+1, k+3, k+5, k+7, etc.) will appear as incrementally lighter modulation of the background. In process 42, images at display 20 are periodically sensed by visual sensors 35 (i.e., image capture subsystem 16) at sample times corresponding to the frame rate of display 20, associated with a timestamp value, and the results forwarded to absolute positioning subsystem 37 (for process 52) and, according to this embodiment of the invention, to relative positioning subsystem 38 for use in identifying relative motion between frames.

In process 64, relative positioning subsystem 38 receives the image frame data captured by image capture subsystem 16 in process 42, and identifies one or more similar elements in those data appearing in alternating frames. In this context, these "alternating" frames refer to images separated by two frame times, for example successive odd-numbered frames (frames k+1 and k+3; frames k+3 and k+5; etc.), or successive even-numbered frames (frames k and k+2; frames k+2 and k+4; etc.). Because the human-invisible positioning targets 60 are in the form of complementary modulation of the background in successive frames, as described above, these positioning targets 60 in alternating frames will be of the same modulation polarity (i.e., both incrementally darker than background, or both incrementally lighter than background). As a result, conventional algorithms for identifying common features in image data will be capable of identifying the same positioning targets 60 appearing in those alternating frames.

In process 66, relative positioning subsystem 38 determines the relative motion of the location of display 20 pointed to by pointing device 10, between the time of a given frame j and the time of the next alternating frame j+2. This determination may be carried out by any one of a number of relative visual motion algorithms, such as object registering, KLT, SURF, SIFT, and ORB, as known in the art. As discussed above, because the alternating frames contain positioning targets 60 of the same modulation polarity, it is contemplated that these conventional algorithms will be readily able to determine the magnitude and direction of motion over these two alternating frames j, j+2.

Following the determination of relative motion in process 66, frame index j as used in processes 64, 66 described above will be incremented, and identification process 64 and determining process 66 will repeated for a next pair of alternating frames j, j+2. According to this embodiment of the invention, index j may be incremented by one frame, such that identification process 66 will identify similar positioning targets of the opposite modulation polarity as in the previous iteration; alternatively, index j may be incremented by two frames, such that positioning targets 60 of the same modulation polarity will be identified in this next iteration. It is of course contemplated that the incrementing of frame index j by one will improve the resolution of the relative motion determination of process 66 over time, and will be better able to detect rapid changes in velocity.

After each iteration of processes 64, 66, relative positioning subsystem 38 executes process 68 to derive the relative motion between successive frames, based on the relative motion determined as occurring over the pair of alternating frames. In other words, as described above, the absolute positioning determination using human-invisible positioning targets 60 is performed by subtracting image frame data from successive frames (i.e., frames adjacent in time). In order to use the alternating-frame visual relative motion sensing to assist this absolute positioning, process 68 determines an estimate of the motion that occurred between the times of frame j and its next successive frame j+1, to enable the image data from those two frames to be subtracted to recover the human-invisible positioning target, as described above relative to FIGS. 3*a* through 3*d*. According to embodiments of this invention, this estimation of the relative motion between frames j, j+1 is based on interpolation of the relative motion between frames j and j+2, as will now be described relative to FIGS. 10*a* and 10*b*.

Figure 10A:
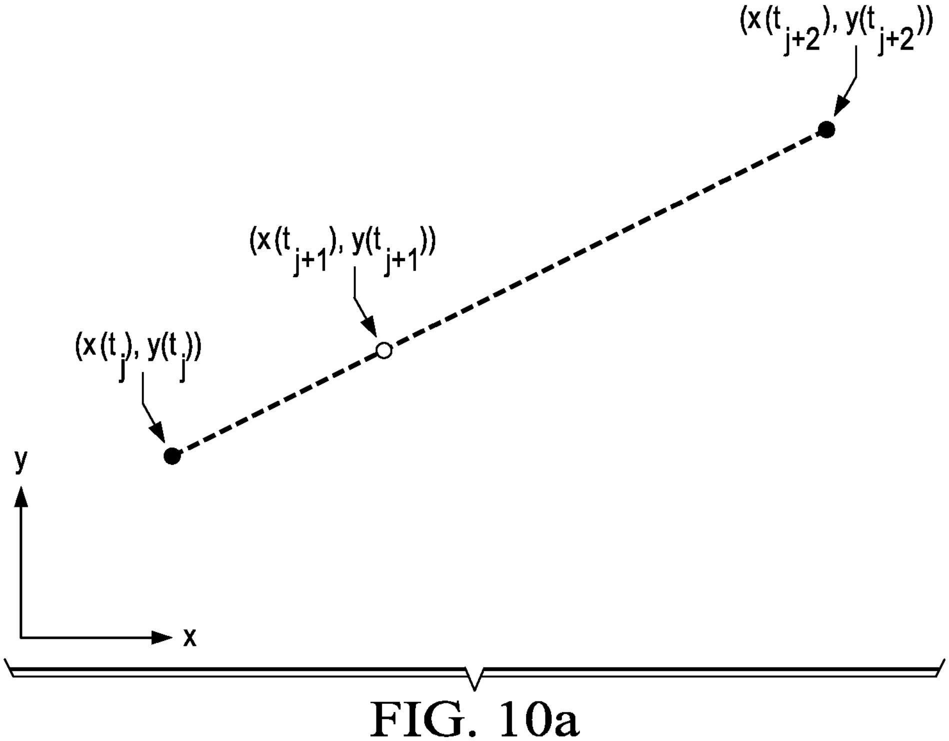
FIGS. 10*a* and 10*b* are plots illustrating the determination of a position at an image capture time for a frame, based on relative motion sensed between frames on either side of that frame.

According to one implementation of this embodiment of the invention, interpolation process 68 is performed by way of a linear estimation of the pointed-to location at display 20. FIG. 10*a* illustrates the detected relative position $(x(t_j), y(t_j)$ at the time of frame j, and position $(x(t_{j+2}), y(t_{j+2}))$ at the time of frame j+2. In this example, relative positioning subsystem 38 estimates position $(x(t_{j+1}), y(t_{j+1}))$ of the pointed-to location at display 20 as occurring at the time of frame j+2, at the midpoint between positions $(x(t_j), y(t_j))$ and $(x(t_{j+2}), y(t_{+2}))$, considering the frame rate as a constant (i.e., the image capture time in frame j+1 occurs at a time exactly between image capture times of frames j and j+2). This interpolated position $(x(t_{j+1}), y(t_{j+1}))$ is then used in the generation of the shift signal SHFT from sensor fusion subsystem 40 (or the shift signal SHFT' from relative positioning subsystem 38, as the case may be) to absolute positioning subsystem 37, for use in shifting either or both of the image frame data of frames j, j+1 into alignment, in process 52. This linear interpolation is based on the assumption that the motion of pointing device 10 over this time is such that the location at display 20 at which it points moves in a substantially linear fashion. This linear assumption is generally made in those systems in which only visual relative motion sensing is performed.

Figure 10B:
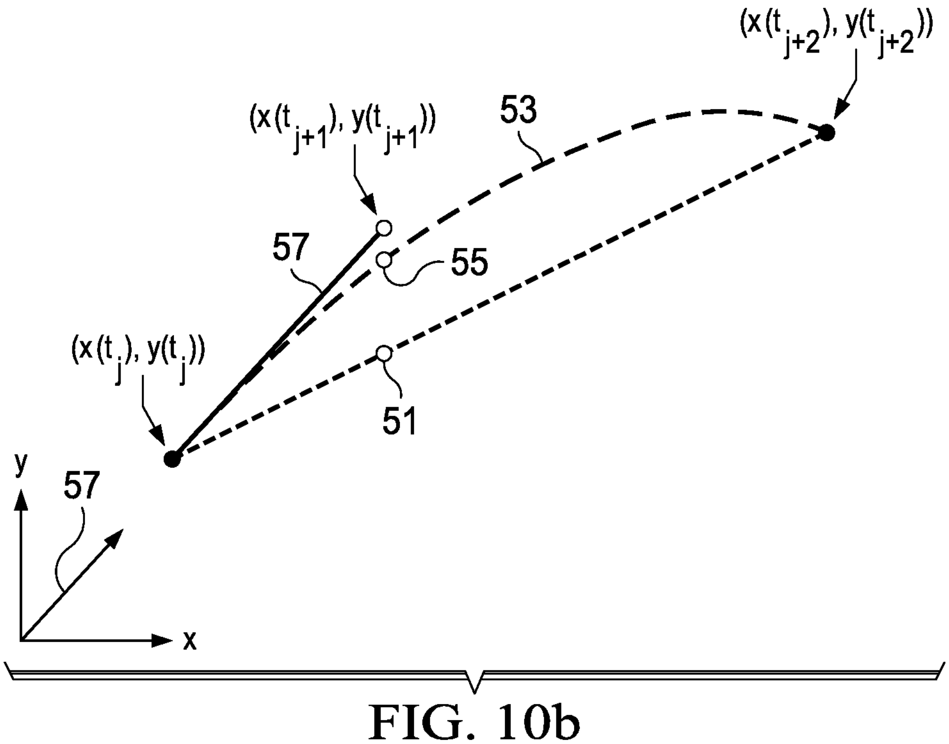

Alternatively, as shown in FIG. 10*b*, process 68 may be carried out in a manner in which the linearity of motion of pointing device 10 is not assumed. For example, as shown in FIG. 10*b*, if the motion of pointing device 10 is non-linear such that the true path of the pointed-to location at display 20 follows path 53 between detected relative position $(x(t), y(t_j))$ at the time of frame j, and position $(x(t_{j+2}), y(t_{j+2}))$ at the time of frame j+2, significant error between the linearly interpolated position 51 for frame j+1 and the true position 55 along true path 53 can result, as shown.

According to this alternative implementation, inertial sensors 17 (FIGS. 2*a* and 2*b*, or motion sensors 36 in FIG. 4) are used to provide additional relative motion information at times between alternating frames j, j+2. As described above, inertial sensors 17 may include such devices as accelerometers, gyroscopes, and magnetometers. For example, considering inertial sensors 17 in the form of accelerometers, acceleration of the movement of pointing device 10 is sensed; the velocity of motion can then be determined by way of a single integration. According to this alternative implementation, interpolation process 38 is performed by relative positioning system 38 by determining the position $(x(t_j), y(t_j))$ of the pointed-to location at the time of frame j, and by estimating velocity vector 57 for the motion of that position at that time, for example by integrating measurements from inertial sensors 17, as shown in FIG. 10*b*. Based on that estimated velocity vector 57 (i.e., having both a magnitude and a direction), relative positioning subsystem 38 then estimates position $(x(t_{j+1}), y(t_{j+1}))$ along the direction of velocity vector 57, at a time corresponding to frame j+1. As evident from FIG. 10*b*, this estimated position $(x(t_{j+1}), y(t_{j+1}))$ may be much closer to true position 55 along true path 53, than that of the linearly interpolated position 51.

While the example of this implementation shown in FIG. 10*b* calculates the "departure" velocity vector 57 of position $(x(t_j), y(t_j))$ at the time of frame j, other velocity-based interpolation approaches may alternatively be used. One such alternative implementation of process 68 would include the determination of an "arrival" velocity vector, by integrating measured acceleration at position $(x(t_{j+2}), y(t_{j+2}))$ at the time of frame j+2. In this case, the interpolation to determine position $(x(t_{j+1}), y(t_{j+1}))$ at frame j+1 would be a "back-interpolation", back in time along the arrival velocity vector. Another alternative approach to process 38 would include two interpolations, one interpolation based on departure velocity vector 57 at position $(x(t_j), y(t_j))$ and the other based on arrival velocity vector at position $(x(t_{j+2}), y(t_{j+2}))$, followed by an averaging of the two interpolation results. It is contemplated that this averaging of the interpolation results based on both the departure and arrival velocities will generally result in the best estimate of the position $(x(t_{j+1}), y(t_{j+1}))$ at frame j+1, but potentially at an increased computational cost.

Figure 10C:
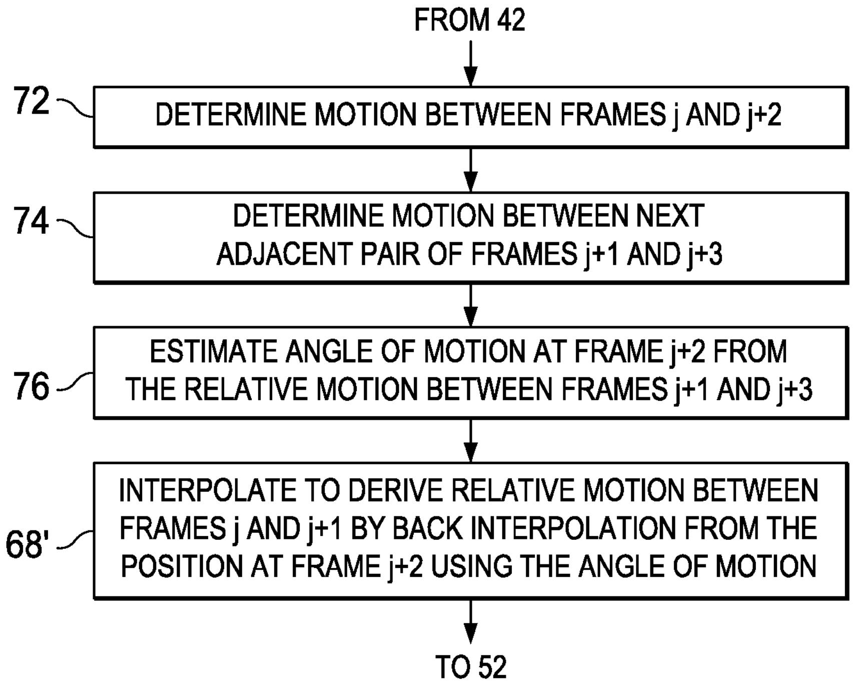
FIG. 10*c* is a flow diagram illustrating the operation of the relative positioning subsystem in the architecture of FIG. 4 according to an alternative implementation of an embodiment of the invention.

Another alternative approach to visual relative motion sensing involves the use of successive pairs of frames in the interpolation process, as will now be described with reference to FIG. 10*c*. As will become evident from this description, this alternative implementation uses image frame data from all frames, with each pair of alternating frames assisting the interpolation performed in adjacent frames. In process 72, relative positioning subsystem 38 receives the captured image frame data from image capture subsystem 16 for one pair of alternating frames j, j+2, and determines relative motion from common image elements in those two frames, using a conventional algorithm as described above. In process 74, relative positioning subsystem 38 receives the captured image frame data from image capture subsystem 16 for an adjacent pair of alternating frames j+1, j+3, and determines relative motion from common image elements in those two frames. As such, following processes 72, 74, relative positioning subsystem 38 has derived estimates for the relative motion in adjacent and overlapping pairs of alternating frames. Relative positioning subsystem 38 then executes process 76 to estimate the angle (i.e., direction) of the relative motion at the time of frame j+2 as the direction of relative motion between adjacent alternating frames j+1, j+3 as determined in process 74. As discussed above, this direction of relative motion between frames j+1, j+3 is essentially a linear direction, based on a comparison of the positions of common display elements in the image frame data from those two frames. This estimated direction of relative motion at the time of frame j+2 is then used in the back-interpolation of the position at frame j+1 in process 68', and thus the relative motion between frames j and j+1, by providing a direction of motion at the time of frame j+2. This process as shown in FIG. 10*c* is then repeated for the next pair of frames, for example by incrementing index j by one, and repeating processes 74, 76, 68' (the relative motion between one pair of frames having already been determined in the prior iteration of process 74). Each iteration of the process of FIG. 10*c* thus produces an estimate of relative motion between frames j, j+1 for use in alignment of positioning targets 60 in process 52, as described above.

This alternative implementation is contemplated to be especially useful in providing a velocity direction at each frame time based solely on visual motion sensing, and as such may provide improved accuracy in the estimate of the position of the complementary positioning target image as compared with the linear interpolation approach, without requiring the presence of inertial sensors 17.

Figure 11:
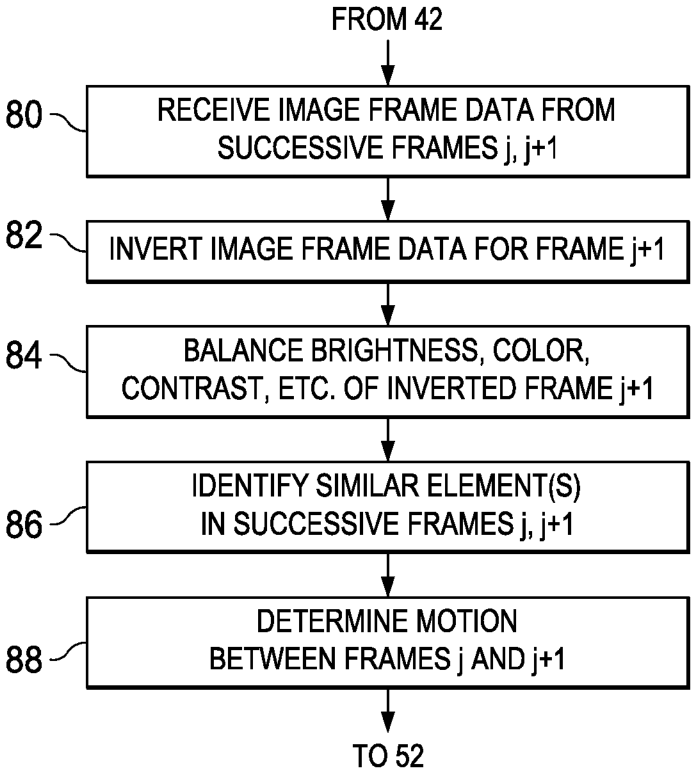
FIG. 11 is a flow diagram illustrating the operation of the relative positioning subsystem in the architecture of FIG. 4 according to another alternative implementation of an embodiment of the invention.

FIG. 11 illustrates the operation of relative positioning subsystem 38 in carrying out visual relative motion sensing according to another alternative implementation of this embodiment of the invention, for use in connection with positioning targets of complementary modulation in successive frames. This alternative process begins in process 80, in which relative positioning subsystem 38 receives image frame data from a pair of successive frames j, j+1 as captured by image capture subsystem 16 in process 42 in the manner described above. In process 82, the captured image data from one of those two frames (e.g., frame j+1) is "inverted", essentially to provide a "negative" of its image frame data as captured. This inversion is contemplated to both be applicable to luminance (i.e., in a grayscale image) and also as applicable to color images (e.g., in the RGB gamut or other color spaces). This inversion of process 82 is intended as a first step in converting the image so that the modulation polarity of the positioning target in frame j+1 matches that of the positioning target in frame j. For example, if the positioning target in frame j is a darker modulation relative to the background of the image and the positioning target in frame j+1 is a brighter modulation relative to the background, inversion of the frame data for frame j+1 in process 82 will result in the positioning target element having a darker modulation relative to its background.

Of course, inversion of the image data of frame j+1 in process 82 will also invert the background frame data. To the extent that background was not neutral (i.e., mid-range), the inversion of process 82 will cause the background of inverted frame j+1 to differ from the background of frame j, which will cause significant confusion in the eventual identification of matching display elements. In process 84, therefore, image processing is applied to the inverted image for frame j+1 to balance its brightness, color, contrast, and other attributes, for example relative to a standard or in some other manner similar to the same attributes for overall image data of frame j, thus compensating for the inversion of the background image data. It is contemplated that those skilled in the art having reference to this specification will be able to readily implement such processing in process 84.

As a result of processes 82, 84, the image frame data of frames j and j+1 should now contain matching elements corresponding to positioning targets 60, even those target patterns were displayed at display 20 using complementary modulation and captured in that form. As a result, conventional visual relative motion algorithms can then carry out process 86 to identify these matching elements of positioning targets 60 in process 86, and determine the relative motion of those positioning targets 60 between the times of frames j, j+1 in process 88. This relative motion between frames j, j+1 as determined in process 88 is then forwarded to absolute positioning subsystem 37 for use in aligning positioning targets 60 in process 52 of the absolute positioning process, as described above relative to FIGS. 5 and 6.

According to this embodiments of this invention, therefore, positioning circuitry 25 can determine the location at display 20 pointed to by pointing device 10 in a precise and accurate manner, using positioning targets and images that are invisible to the human audience and thus suitable for use in "white board" applications, even in situations in which the user is moving pointing device 10 at a velocity and over a distance that is significant relative to the frame rate of the system. It is contemplated that this compensation for motion as applied to the absolute positioning process will significantly improve the operation of the interactive display system, as well as the experience provided to the audience.

While this invention has been described according to its embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of operating a computer system including a handheld human interface device, comprising:

generating visual payload image frame data;

combining, with the visual payload image frame data, at least one positioning target pattern corresponding to complementary intensity variances at one or more selected pixel locations of the visual payload image frame data, applied in first and second consecutive frames;

displaying the combined visual payload image frame data and positioning target pattern on a display;

capturing, at the handheld human interface device, image data representative of at least a portion of the display including the positioning target, from each of the first and second frames;

detecting relative motion of the device between the times at which image data is captured from the first and second frames, based on measurements acquired from one or more motion sensors in the device;

aligning the image data of the first and second frames based on the detected relative motion;

subtracting the aligned image data from the first and second frames from one another to recover the positioning target pattern as viewed at the device; and determining a location of the display at which the device is pointing at the time of one of the first and second frames, responsive to the recovered positioning target pattern.

2. The method of claim 1, wherein the one or more motion sensors comprise:

an image capture subsystem.

3. The method of claim 1, wherein the one or more motion sensors comprise:

a plurality of inertial sensors for sensing relative motion in of three orthogonal directions.

4. The method of claim 3, wherein the one or more relative motion sensors further comprise:

an image capture subsystem.

5. The method of claim 1, wherein the aligning step comprises:

shifting the position of an element in the captured image data for one of the first and second frames by a magnitude and direction corresponding to the detected relative motion.

6. The method of claim 5, wherein the aligning step further comprises:

scaling the size of the element in the captured image data for one of the first and second frames according to the detected relative motion in a direction normal to the display.

7. The method of claim 5, wherein the aligning step further comprises:

rotating the element in the captured image data for one of the first and second frames by an amount corresponding to the detected relative motion of the device about an axis normal to the display.

8. The method of claim 5, wherein the aligning step further comprises:

skewing the element of the image data for one of the first and second frames by an amount corresponding to the detected relative motion of the device about one or more axes parallel to the display.

9. The method of claim 1, wherein the combining step comprises:

inverting the captured image data from the second frame; and adding the aligned image data from the first and second frames to recover the positioning target pattern as viewed at the device.

10. The method of claim 1, further comprising:

capturing, at the handheld human interface device, image data representative of at least a portion of the display including the positioning target from a third frame;

wherein the step of detecting relative motion of the device between the times at which image data is captured from the first and second frames comprises:

detecting relative motion of the device between the times at which image data is captured from the first and third frames; and interpolating the relative motion of the device between the times at which image data is captured from the first and second frames, from the detected relative motion of the device between the first and third frames.

11. An interactive display system, comprising:

a computer for generating display image data to be displayed on a display;

graphics output circuitry for generating graphics output signals corresponding to the display image data in a format suitable for display;

a pointing device, comprising:

a hand-held housing;

an image sensor disposed in the housing;

one or more motion sensors; and image capture circuitry for capturing image data obtained by the image sensor; and positioning circuitry for determining a location at the display at which the pointing device is aimed by performing a plurality of operations comprising:

generating visual payload image frame data;

combining, with the visual payload image frame data, at least one positioning target pattern corresponding to complementary intensity variances at one or more selected pixel locations of the visual payload image frame data, applied in first and second consecutive frames;

displaying the combined visual payload image frame data and positioning target pattern on a display;

capturing, at the handheld human interface device, image data representative of at least a portion of the display including the positioning target, from each of the first and second frames;

detecting relative motion of the device between the times at which image data is captured from the first and second frames, based on measurements acquired from one or more motion sensors in the device;

aligning the image data of the first and second frames based on the detected relative motion;

subtracting the aligned image data from the first and second frames from one another to recover the positioning target pattern as viewed at the device; and determining a location of the display at which the device is pointing at the time of one of the first and second frames, responsive to the recovered positioning target pattern.

12. The system of claim 11, wherein the one or more motion sensors are comprised by the image capture circuitry.

13. The system of claim 11, wherein the one or more motion sensors comprise:

a plurality of inertial sensors for sensing relative motion in of three orthogonal directions.

14. The system of claim 13, wherein the one or more relative motion sensors are comprised by the image capture circuitry.

15. The system of claim 11, wherein the aligning operation comprises:

shifting the position of an element in the captured image data for one of the first and second frames by a magnitude and direction corresponding to the detected relative motion.

16. The system of claim 15, wherein the aligning operation further comprises:

scaling the size of the element in the captured image data for one of the first and second frames according to the detected relative motion in a direction normal to the display.

17. The system of claim 15, wherein the aligning operation further comprises:

rotating the element in the captured image data for one of the first and second frames by an amount corresponding to the detected relative motion of the device about an axis normal to the display.

18. The system of claim 15, wherein the aligning operation further comprises:

skewing the element of the image data for one of the first and second frames by an amount corresponding to the detected relative motion of the device about one or more axes parallel to the display.

19. The system of claim 11, wherein the combining operation comprises:

inverting the captured image data from the second frame; and adding the aligned image data from the first and second frames to recover the positioning target pattern as viewed at the device.

20. The system of claim 11, further comprising:

capturing, at the handheld human interface device, image data representative of at least a portion of the display including the positioning target from a third frame;

wherein the operation of detecting relative motion of the device between the times at which image data is captured from the first and second frames comprises:

detecting relative motion of the device between the times at which image data is captured from the first and third frames; and interpolating the relative motion of the device between the times at which image data is captured from the first and second frames, from the detected relative motion of the device between the first and third frames.

* * * * *